US012476000B2

(12) United States Patent
Dsouza et al.

(10) Patent No.: US 12,476,000 B2
(45) Date of Patent: Nov. 18, 2025

(54) MACHINE LEARNING TO MANAGE SENSOR USE FOR PATIENT MONITORING

(71) Applicant: MatrixCare, Inc., Bloomington, MN (US)

(72) Inventors: Keegan Duane Dsouza, Ocala, FL (US); Kedar Mangesh Kadam, Halifax (CA); Adhiraj Ganpat Prajapati, St. Paul, MN (US)

(73) Assignee: MATRIXCARE, INC., Bloomington, MN (US)

( * ) Notice: Subject to any disclaimer, the term of this patent is extended or adjusted under 35 U.S.C. 154(b) by 831 days.

(21) Appl. No.: 17/449,751

(22) Filed: Oct. 1, 2021

(65) Prior Publication Data

US 2023/0107394 A1 Apr. 6, 2023

(51) Int. Cl.
*G16H 40/63* (2018.01)
(52) U.S. Cl.
CPC .................................. *G16H 40/63* (2018.01)
(58) Field of Classification Search
CPC ................................ G16H 40/63; G16H 40/20
See application file for complete search history.

(56) References Cited

U.S. PATENT DOCUMENTS

| 2016/0113591 | A1* | 4/2016 | Pijl | A61B 5/002 340/870.07 |
|---|---|---|---|---|
| 2018/0008797 | A1* | 1/2018 | Kozloski | A61M 21/00 |
| 2019/0110763 | A1* | 4/2019 | Brasch | G16H 40/20 |
| 2019/0239775 | A1* | 8/2019 | Movva | A61B 5/0017 |
| 2020/0408545 | A1* | 12/2020 | Gordon | G01C 21/3438 |
| 2021/0142912 | A1* | 5/2021 | Belliveau | H04W 12/068 |

* cited by examiner

*Primary Examiner* — Evangeline Barr
(74) *Attorney, Agent, or Firm* — Patterson + Sheridan, LLP

(57) ABSTRACT

Techniques for improved sensor monitoring using machine learning are provided. An elopement likelihood indicating a probability of elopement for a patient in a care setting is generated by processing first patient data using a trained machine learning model. One or more sensor devices are enabled in response to determining that the elopement likelihood exceeds a threshold. Second patient data is collected for the patient using the enabled one or more sensor devices. An intervention for the patient is selected based on the second patient data, and the intervention is enacted.

20 Claims, 12 Drawing Sheets

MACHINE LEARNING TO MANAGE SENSOR USE FOR PATIENT MONITORING

INTRODUCTION

Aspects of the present disclosure relate to machine learning. More specifically, aspects of the present disclosure relate to using machine learning to manage use of sensor devices to monitor patient movement.

Patients in care settings often become disoriented. This disorientation can be a result of a variety of factors, including age, dementia, medication, and other medical issues. Further, even non-disoriented patients in care settings may attempt to enter unpermitted areas or otherwise leave the facility without authorization. This may be referred to as patient elopement.

Patients who elope can suffer serious injuries, or even death, due to a number of hazards including weather exposure, failure to take required medication, and car accidents. In existing systems and settings, preventing such elopements requires significant manpower and manual oversight. For example, many existing systems rely on manually-reviewed data such as security camera footage in order to detect, prevent, and respond to elopement.

Although some devices and systems have been introduced to improve tracking of patients, these systems often fail to prevent elopement. For example, systems relying on tracking devices or sensors in or near the patients are often removed or tampered with. Moreover, these sensors often generate a massive amount of data, rendering them virtually useless when any significant number of patients are present, and similarly consuming significant network bandwidth and computational resources. These monitoring systems can further invoke privacy concerns.

Further, many such devices (e.g., wearable or otherwise portable sensors) have independent power sources, but the constant communication between the reader and the device required for keeping track of each patient presents an enormous drain on the portable power source of the device, such that the device cannot often be relied upon to provide an accurate location of the patient at any given time because the device may not be powered.

Improved systems and techniques to manage sensor devices and predict, detect, and/or prevent elopement are needed.

SUMMARY

According to one embodiment presented in this disclosure, a method is provided. The method includes: generating a first elopement likelihood indicating a probability of elopement for a patient in a care setting by processing first patient data using a trained machine learning model; enabling one or more sensor devices in response to determining that the first elopement likelihood exceeds a threshold; collecting second patient data for the patient using the enabled one or more sensor devices; selecting an intervention for the patient based on the second patient data; and enacting the intervention.

According to a second embodiment of the present disclosure, a computer program product is provided. The computer program product comprises logic encoded in a non-transitory medium, the logic executable by operation of one or more computer processors to perform an operation comprising: generating a first elopement likelihood indicating a probability of elopement for a patient in a care setting by processing first patient data using a trained machine learning model; enabling one or more sensor devices in response to determining that the first elopement likelihood exceeds a threshold; collecting second patient data for the patient using the enabled one or more sensor devices; selecting an intervention for the patient based on the second patient data; and enacting the intervention.

According to a third embodiment of the present disclosure, a system is provided. The system comprises one or more computer processors; and logic encoded in a non-transitory medium, the logic executable by operation of the one or more computer processors to perform an operation comprising: generating a first elopement likelihood indicating a probability of elopement for a patient in a care setting by processing first patient data using a trained machine learning model; enabling one or more sensor devices in response to determining that the first elopement likelihood exceeds a threshold; collecting second patient data for the patient using the enabled one or more sensor devices; selecting an intervention for the patient based on the second patient data; and enacting the intervention.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
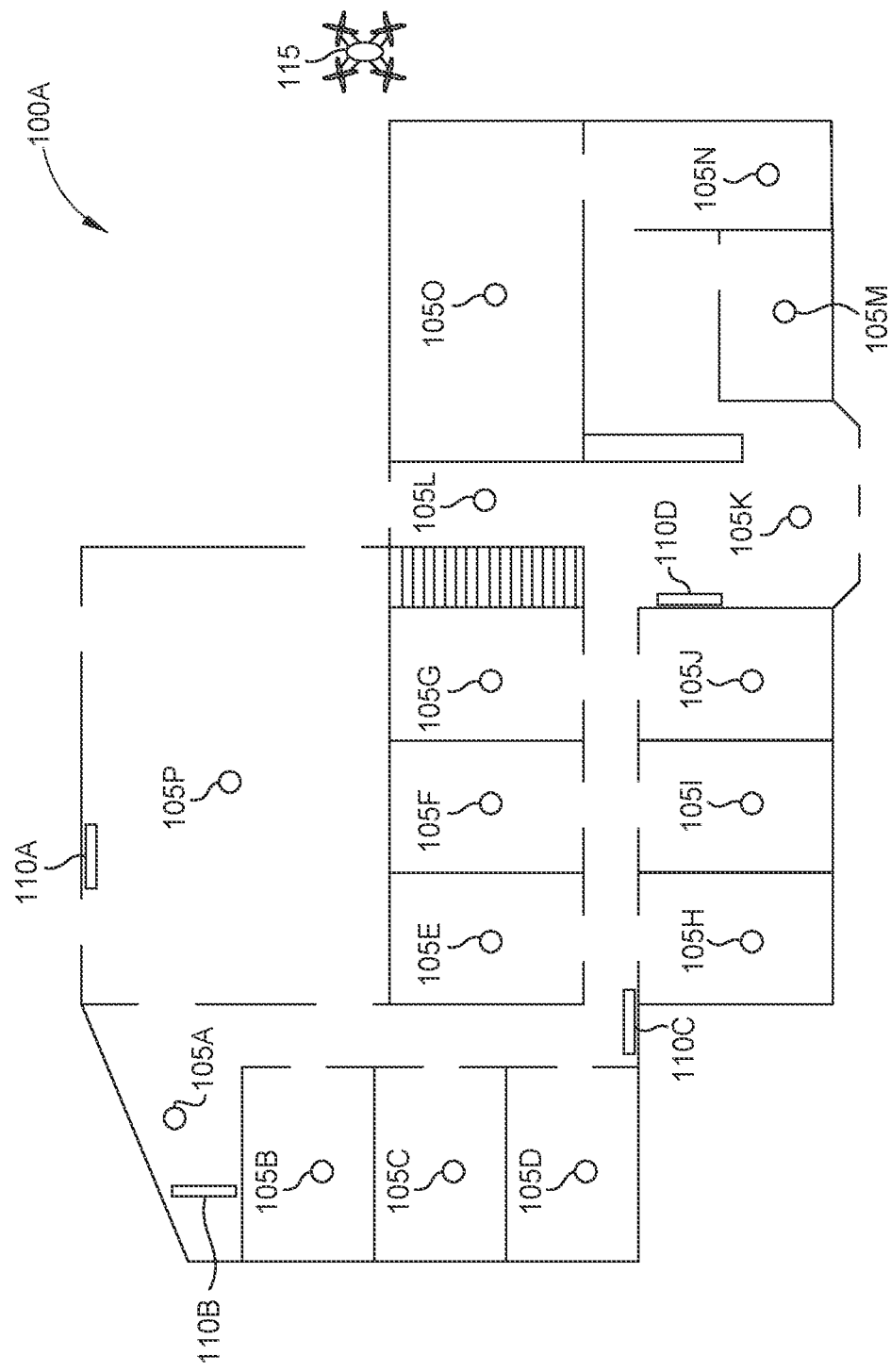
FIGS. 1A, 1B, 1C, 1D, and 1E depict an example care setting and various components of an improved monitoring system, according to some embodiments of the present disclosure.

Aspects of the present disclosure provide apparatuses, methods, processing systems, and computer-readable mediums for predicting, detecting, preventing, and/or responding to patient elopement via machine learning and improved sensor management.

Often, because patients may elope without any prior history of doing so, past history alone is generally insufficient to determine which patients are at risk of elopement. Further, because elopement may occur relatively randomly, it is difficult or impossible for conventional systems to identify patient(s) who are at risk of eloping (or who are currently eloping). Embodiments of the present disclosure provide techniques to identify patients at risk of elopement, as well as to respond quickly and accurately to prevent or stop such elopement and ensure the safety of the patient.

In some embodiments, one or more trained machine learning models are used to evaluate a variety of patient data in order to predict which patient(s) may be at risk of elopement (e.g., by generating an elopement likelihood for each patient). Based on the output of these models, in some embodiments, the system can selectively and dynamically enable various sensor devices (or begin processing data from such devices) to more-accurately detect the location and movement of the at-risk patient(s). This updated location and/or movement information can be used to drive more intelligent, targeted, and accurate interventions, which can significantly reduce the risk of patient harm during an attempted elopement.

By using trained machine learning models to identify at-risk patients, embodiments of the present disclosure enable significantly improved accuracy and reliability of elopement-detection systems, as compared to existing systems. Further, by selectively and dynamically enabling sensor devices (or beginning processing of the sensor data), aspects of the present disclosure can significantly enhance patient privacy (allowing patient actions to remain private when they are not eloping or at risk of doing so).

Moreover, this selective sensor enablement can dramatically improve the operations and functionality of the computing system itself, such as through reduced network congestion, reduced data storage and processing costs, reduced power consumption, improved device battery life, and the like. For example, because data from the sensor devices is only processed when the patient is at risk of (or is currently) eloping, the data (if it is generated at all) need not be transmitted constantly, thereby reducing network use. Similarly, the data need not be stored or otherwise processed, resulting in reduced computational expense. Additionally, because the data is not constantly monitored, the sensor devices can consume less power and fewer resources (either by refraining from transmitting the data, or by refraining from collecting or recording it entirely), resulting in improved battery life.

As an additional improvement, some embodiments of the present disclosure use this targeted data and analysis to provide for more targeted interventions for eloping patients. This may include, for example, outputting media only on specific devices (e.g., those located proximate to the eloping patient), identifying and outputting specific interventions for the specific patient (e.g., outputting an audio recording of the eloping patient's family), and the like. Such targeted interventions, which can act as a specific and directed therapy for a specific patient, can improve patient security and safety, as well as reduce inconvenience for other patients.

Example Environment for Improved Monitoring System

FIGS. 1A, 1B, 1C, 1D, and 1E depict an example environment with various components of a patient monitoring system, according to some embodiments of the present disclosure.

In the illustrated example of FIG. 1A, the environment 100A corresponds to a care setting. Although care settings are used in some examples discussed herein for conceptual clarity, aspects of the present disclosure are readily applicable to a wide variety of environments. As used herein, a "care setting" is a physical space or area where "patients" reside or occupy, either temporarily or on a long-term basis. For example, the environment 100A may be a facility for patients who are unable to live alone (without aid or assistance) due to age, mental capacity, and the like.

The illustrated example depicts a portion of the care setting as a floor plan, with a variety of rooms and spaces. Additionally, as illustrated, a number of sensors (or sensor suites) 105 are distributed around the care setting. For example, a set of sensors 105K may be located in an entryway of the facility, while sensors 105B-105J are located in patient rooms. Additionally, although depicted as residing in fixed locations for conceptual clarity, in some embodiments, some of the sensors 105 may be mobile (e.g., on moving objects), and/or may be associated with one or more users (e.g., carried devices such as smartphones, as well as wearable, implantable, or ingestible devices).

The sensors 105 can generally include a wide variety of sensor devices to collect data that relates to users (e.g., patients and/or caregivers) in the environment 100A, or data related to the environment in general. For example, the sensors 105 may include biometric indicators (e.g., heartrate monitors, adrenaline monitors, blood pressure monitors, blood glucose monitors, pulse oximeters, and the like) monitoring one or more users, sensors to detect user location or movement such as pressure sensors, radio-frequency identification (RFID) sensors or tags, global positioning system (GPS) sensors, local positioning sensors, devices that interact with stationary beacons (e.g., where the beacon can detect and report nearby devices, or where the device can detect and report nearby beacons), weather sensors, imaging sensors (e.g., cameras or video cameras), audio sensors (e.g., microphones), infrared (IR) sensors, impulse radar sensors, motion sensors, and the like.

Additionally, though not depicted in the illustrated example, in some embodiments the sensors 105 can include components that retrieve data from a variety of sources, such as social media analyzers (which may, for example, retrieve and evaluate data from social media platforms). In embodiments, the sensors 105 can generally be used to collect data to drive targeted interventions, as discussed in more detail below.

In some embodiments, some or all of the sensors 105 may be selectively or dynamically controlled by the monitoring system. In one such embodiment, some or all of the sensors 105 may be disabled or otherwise configured to not provide data during ordinary use (e.g., when no patients are eloping). For example, the sensors 105 may be deactivated otherwise instructed to refrain from collecting data, or may be instructed to discard any data that is collected. If certain conditions or criteria are met, as discussed in more detail below, one or more of the sensors 105 may be activated or enabled (e.g., such that it begins collecting and/or recording data, or begins transmitting the data to a centralized monitoring system). This selective sensor use can significantly improve the operations of the system, as discussed above.

The illustrated environment 100A also includes one or more output devices 110. The output devices 110 can generally include any device or component that outputs data or information in the space, such as displays (e.g., smart televisions), speakers to output audio, lighting that can be controlled remotely (e.g., signage or other lighting), personal communication devices (e.g., tablets or smartphones), and the like.

Additionally, though not depicted in the illustrated example, in some embodiments the output devices 110 can include control components for the facility, such as door and window locks. In embodiments, the output devices 110 can generally be used to enact the targeted interventions, as discussed in more detail below.

For example, the output devices 110 may be used to output targeted messages for the eloping patient(s), such as recordings of the patient's associates (e.g., family, friends, or caregivers). In some embodiments, the output devices 110 can be used to redirect the eloping patient (e.g., by selectively illuminating or projecting signage or other indicators such as arrows or paths on the floor, by instructing the patient via displays, speakers, or holographic images, by locking and/or unlocking doors in the facility, and the like. Further, in some embodiments, the output devices 110 can be used to guide caregiver(s) to the patient, such as via user smartphones or tablets, illuminating signage or other indicators, outputting instructions or maps via displays or speakers, locking or unlocking doors, and the like.

The illustrated example also includes a drone 115 located outside of the care setting. For example, the drone 115 may include a flying device (e.g., a quadcopter), a wheeled or legged device, and the like. Generally, the drone 115 may be used to identify or locate users who are not within the range of the sensors 105. For example, the environment 100A may have sensors 105 scattered throughout the facility, which may include, in some embodiments, outside the building(s) (e.g., in garden areas, patios, decks, and the like). However, if the user departs these sensor 105 areas, in some embodiments, the system may trigger the drone 115 to begin searching for the user, as discussed in more detail below.

Figure 1B:
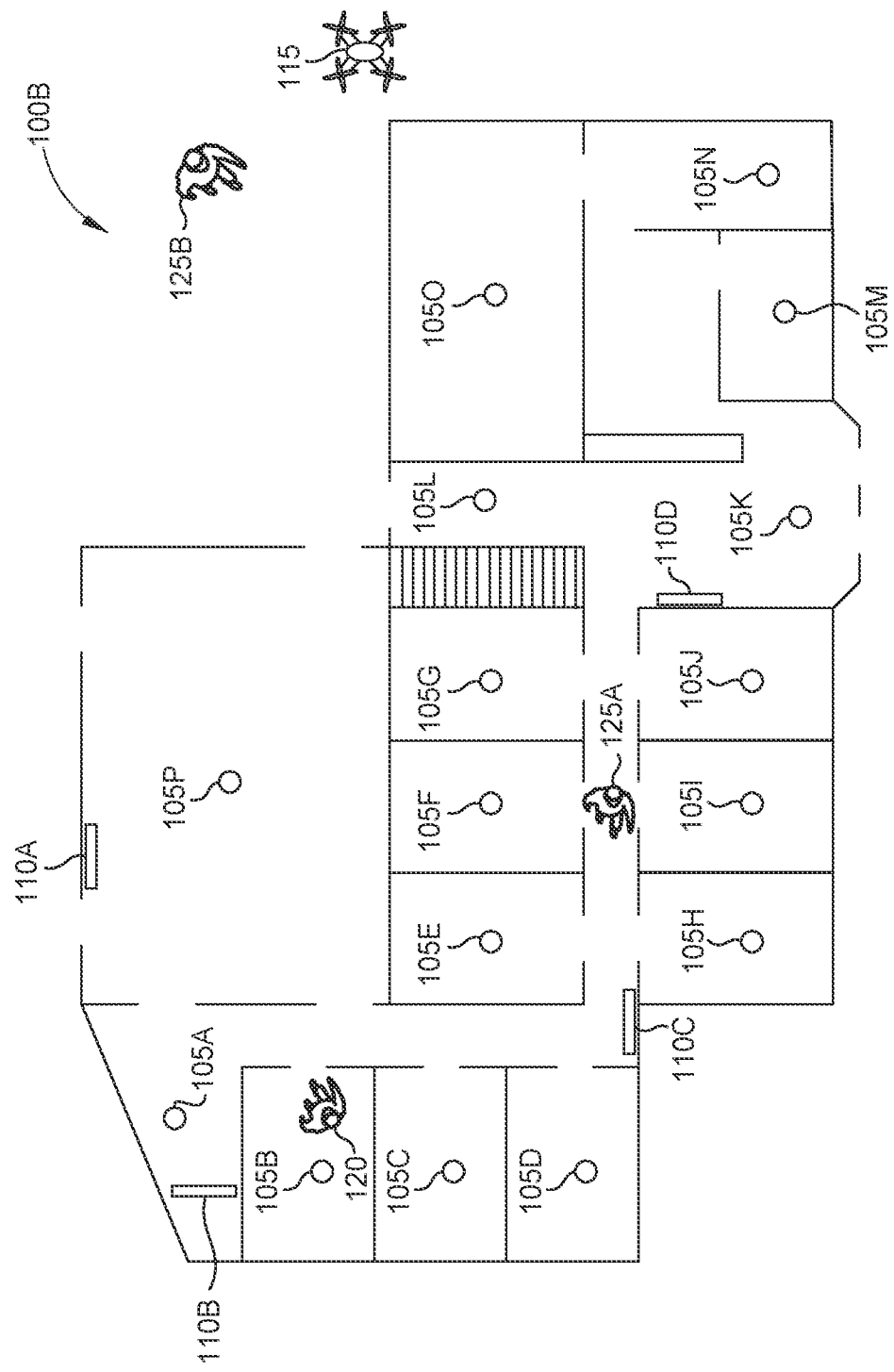

FIG. 1B depicts the care setting environment, indicated by 100B, with the above-discussed sensors 105, output devices 110, and drone 115 arranged throughout. Additionally, in the illustrated example, the environment 100B includes a patient 120 and two caregivers 125A and 125B. Although a single patient 120 is depicted for conceptual clarity, in embodiments, there may of course be any number of patients (or other users, such as guests) in the facility. Similarly, though two caregivers 125A-B are depicted, in embodiments, there may be any number of caregivers (or other users) in the facility.

The patient 120 is located in a room associated with a set of sensors 105B. For example, the room may correspond to an assigned room (e.g., where the patient lives) of the patient. Although not included in the illustrated example, in some embodiments, the patient 120 and/or caregivers 125 may additionally or alternatively have one or more sensors on their bodies, such as wearable, implantable, or ingestible sensors, communication devices that can be carried (e.g., smartphones), and the like. In the illustrated example, the sensors 105B (as well as the other sensors 105 in the setting) are deactivated, disabled, or otherwise not collecting, storing, and/or transmitting data. For example, the sensors 105 may be in an initial or ordinary state, used when no patient(s) are eloping or at sufficiently-high risk of elopement.

In some embodiments, as discussed in more detail below, the risk of elopement for a given patient is predicted using one or more trained machine learning models. These models may consider a variety of data, such as assessments of the caregivers, mood or behavioral data, demographic data for the patient, conflict or other familial or relationship data, data relating to recent changes in the patient's life, medical diagnoses or conditions, medications the patient is on, how long the patient has resided in the facility, movement patterns of the patient, and the like. In an embodiment, these and other data may be used to generate an elopement likelihood for each patient in the setting. In some embodiments, the data can also be used to generate a facility-wide risk score across multiple patients, indicating an overall level of risk for the environment.

Figure 1C:
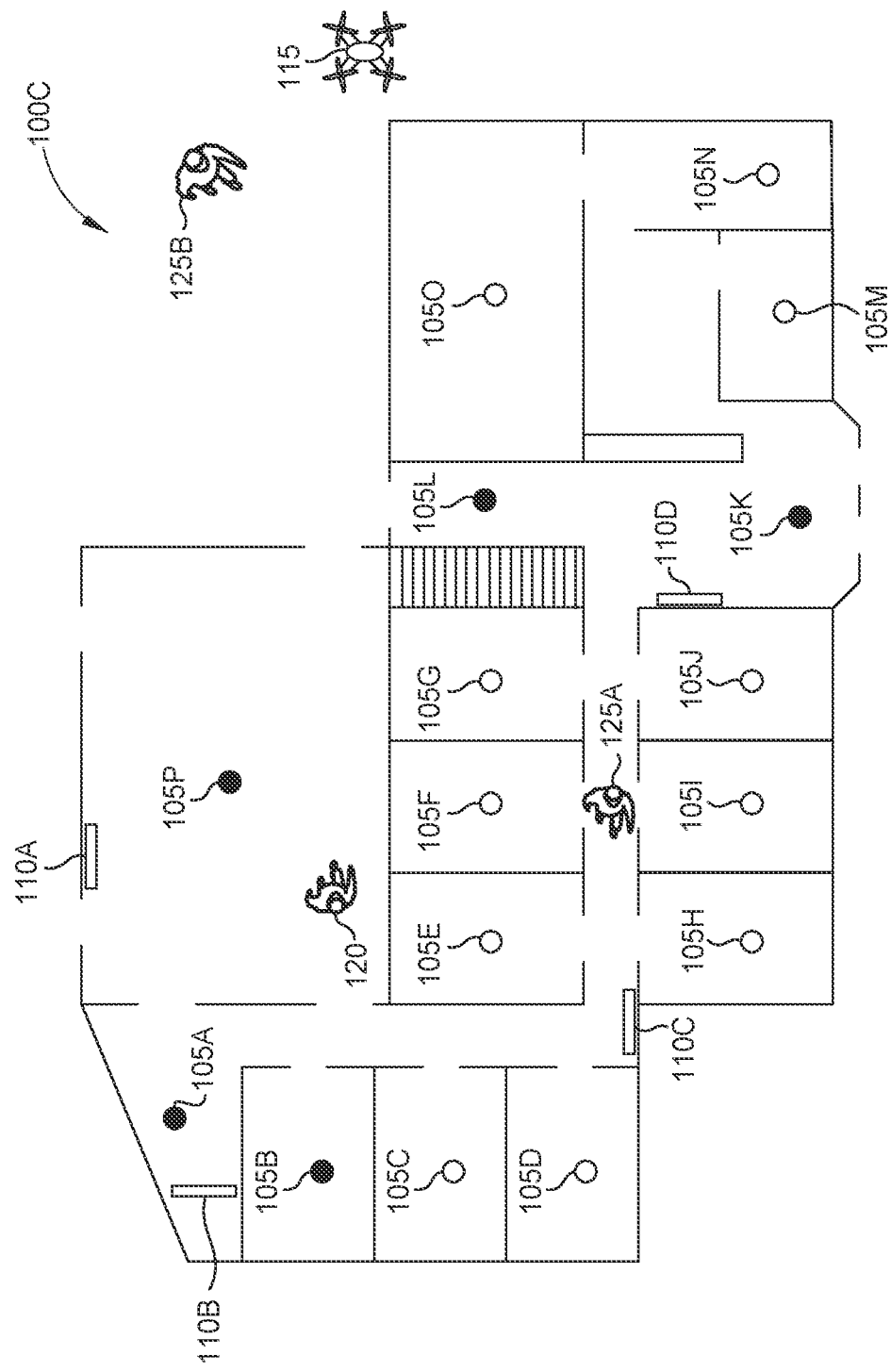

In FIG. 1C (labeled 100C), the monitoring system has determined, based on the output of the machine learning models (e.g., if the elopement likelihood exceeds a threshold), that the patient 120 is either at high risk of eloping or is currently eloping. In response, the system can identify and enable a set of sensors 105. In some embodiments, the monitoring system identifies and enables sensors that are directly associated with the eloping or at-risk patient 120 based on a database or other set of record(s) indicating associations between sensors 105 and patients, and/or locations of each sensor 105 in the space. For example, the system may identify and enable the sensors in the assigned room of the patient, the sensors worn by or otherwise on body the patient, and the like. In some embodiments, the system may further enable other sensors, such as those in common or shared areas of the facility.

Additionally, in some embodiments, the system may evaluate various aspects of patient data to determine which sensors 105 should be activated. For example, in one such embodiment, the system may determine the last-known location of the patient 120, and activate one or more sensors in this area (or in adjacent areas). In some embodiments, the system may evaluate the patient's previous behavior to determine movement patterns or preferences regarding places the patient frequents (during ordinary days, or specifically during prior elopements). The system may then enable sensors in these specific areas.

In the illustrated example, the system has enabled sensors 105B (in the room associated with the patient 120), as well as sensors 105A, 105P, 105L, and 105K in common areas (e.g., areas of the facility where guests and patients are generally allowed to be). Although the illustrated example includes enabling sensors in public areas upon detecting or predicting elopement, in some embodiments, some of the sensors (e.g., those in public areas) may always be activated.

In an embodiment, the enabled sensors 105 are generally used to determine or estimate the current location and/or movement of the patient 120. For example, imaging sensors may capture one or more images, which are then analyzed using one or more image recognition techniques (such as facial recognition, gait recognition, and the like). Similarly, audio sensors may capture audio, which can then be evaluated using audio recognition techniques (e.g., voice recognition). In some embodiments, sensor(s) on the patient are activated (e.g., instructed to begin transmitting pings, or to report all visible beacons or devices). This can allow the patient to be located.

In some embodiments, if the newly-activated sensors 105 indicate that the patient 120 has not eloped (e.g., if the patient 120 is still in his assigned room, or is otherwise in a normal and allowable location), the system can generate an indication (e.g., to one or more caregivers 125) that the patient 120 is safe, and the sensors 105 can be deactivated. In some embodiments, the system may nevertheless instruct a caregiver to make contact with the patient to engage them in conversation and make an assessment regarding their mental or physiological state. In at least one embodiment, the system may leave the sensors 105 enabled and continue to monitor them until some other criteria are satisfied. For example, the system may continue to collect and evaluate the sensor data for a minimum period of time, until the elopement likelihood or risk score of the patient declines below the defined threshold, until a caregiver reaches the patient to assess the concerns, and the like.

In the illustrated example, based on the real-time data provided by the activated sensors 105, the system can determine that the patient 120 is currently eloping or is otherwise out of place. For example, the system may identify elopement based on the current time (e.g., whether patients typically occupy the current location at this time), day of the week, current weather (e.g. whether patients can or should be outdoors during this type of weather), historical movement or behavioral patterns of the patient 120, the category of the area where the patient 120 is (e.g., whether it is a public space, employee space, and the like), current behavior of the patient (e.g., their gait, facial expression, tone of voice, etc.), and the like. In some embodiments, a second set of one or more machine learning models are used to evaluate this data. That is, a first model may evaluate relatively static (e.g., not collected in real-time) patient data such as caregiver assessments, current medications and diagnoses, familial changes, and the like to generate elopement likelihoods indicating at-risk patients. A second model may then be used to evaluate the real-time data (e.g., current location of the patient, current behavior, current biometric readings, and the like) in order to determine whether an at-risk patient is actively eloping or is about to elope.

Figure 1D:
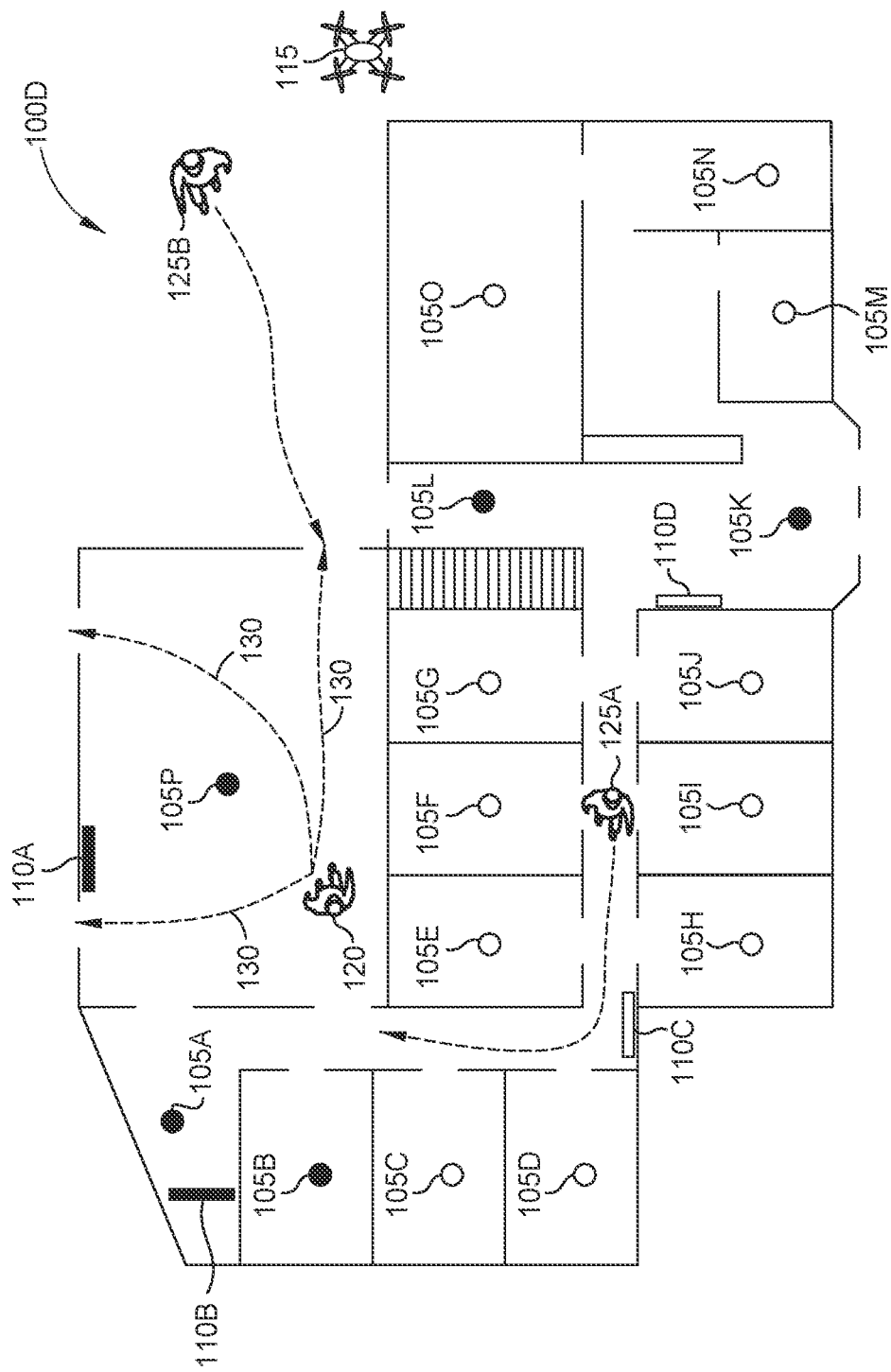

In the illustrated example of FIG. 1D (labeled 100D), the monitoring system has determined or predicted that the patient 120 is eloping. This may be, for example, because the patient 120 is not normally in the current location at the current time, because the area is off-limits at the time, because the patient's heart rate is elevated, and the like. In response to this determination, the monitoring system has selected or generated a set of one or more interventions, which are enacted via one or more output devices 110 in the space.

Specifically, in the illustrated example, the monitoring system has enabled output devices 110A and 110B, which are near the current location of the patient (e.g., within a defined distance, within the space room or space, close enough to be heard or seen by the patient 120, and the like). In some embodiments, as discussed above, these output devices 110 may be used to output specific or targeted messages for the patient 120. For example, the system may retrieve a recording of a family member, friend, trusted caregiver, or authority figure for the patient 120. This recording (which may include audio and/or visual data) can be output via one or more output devices 110, in order to persuade the patient 120 to remain in the location or otherwise cease the elopement.

In some embodiments, the system can attempt to establish a live communication link (e.g., an audio and/or video chat) with one or more associates of the patient 120 (e.g., family members). If accepted, the output device(s) 110 can be used to provide one-way or two-way live communication between the patient 120 and the associates of the patient.

In some embodiments, the monitoring system can determine or predict one or more future actions of the patient 120. For example, as illustrated by the dashed lines 130, the system can predict a future path or trajectory of the patient 120. This prediction may be based on a variety of patient data and/or real-time data, such as their current location, a map of the facility, immediately-prior location(s) of the patient, current movement direction, historical movement patterns of the patient 120, current time of day, current outdoor weather (which may cause the patient to move to a different location, such as an internal room without windows, or to seek out, or avoid, leaving the building due to the current weather), and the like. In the illustrated example, the system predicts that the patient 120 will continue in their current direction, leaving the care facility via one of the doors in the current room. This prediction may be generated using one or more trained machine learning models, in some embodiments.

In some embodiments, the generated interventions can be based, in part, on the predicted future actions or paths of the patient 120. For example, the system may automatically lock the door(s) that the patient is predicted to exit through. In some embodiments, the system may identify or generate one or more alternative paths for the patient 120 (e.g., to lead the patient back towards their room, or to keep them stationary). The system can then use the output devices 110 to attempt to guide the patient along one or more alternative paths (e.g., via illuminated signage, projected or illuminated lines or arrows on the floor or wall, holographic representations of a caregiver or trusted individual, and the like).

Additionally, in some embodiments, the monitoring system can generate intervention instructions for one or more caregivers 125. For example, the system may identify one or more caregivers 125 that are located proximate to the patient 120 (e.g., the closet one(s), the closest one(s) that are not currently occupied, and the like). Based on the current location of the patient and/or the predicted paths 130 (as well as the known floor plan of the environment), the system may generate one or more intercept path(s), indicated by dashed lines 135A and 135B, to guide the caregiver to the patient 120.

In the illustrated example, the system has determined that the caregiver 125A should continue down the hallway to arrive behind the patient 120. Similarly, the system has determined that the caregiver 125B should proceed to the indicated doorway (e.g., because it is most likely that the patient will exit via that door). In some embodiments, because the system predicts that the patient will continue forward out of the doors (or because the outdoor area is considered less safe than the indoor one), the system may instead instruct the caregiver 125A to proceed towards the right and outside to intercept the patient 120 leaving the doors. The caregiver 125B may be instructed to proceed towards one of the other exit doors.

In various embodiments, the system can guide the caregivers 125 along the intercept path(s) in various ways. For example, the system may transmit, to a smartphone, tablet, or other device used by the caregiver 125, an indication as to where the patient is currently located, the predicted future paths, and/or the optimum intercept point(s). In some embodiments, the system can indicate the intercept path (e.g., via a map of the facility, or via illuminated or projected signage, lines or arrows, or other displays). In some embodiments, the system may also facilitate movement along this path, such as by unlocking doors through which the caregiver will pass, locking other doors to prevent other patients or guests from interfering or entering the area, and the like.

Figure 1E:
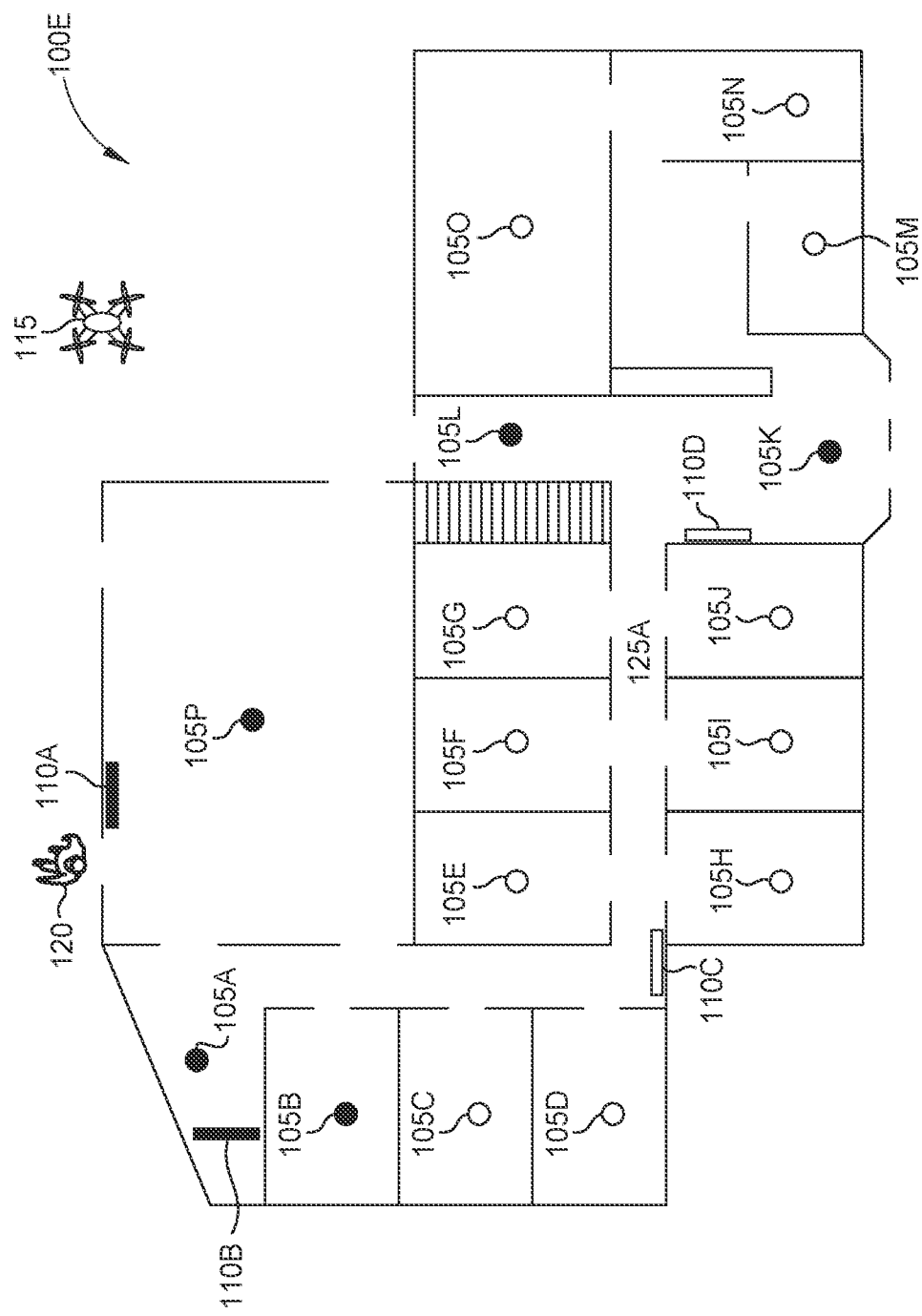

FIG. 1E depicts an environment 100E where the patient 120 has left the care facility. For example, based on a camera or other sensors located at or near an exit door, the system may determine that the patient 120 has exited. As discussed above, this may include determining that the patient has left the sensor area, and entered (or is about to enter) an area where there are no sensors 105 (or fewer sensors). For example, the patient 120 may be on the grounds of the facility outside of the building, or may have left the grounds entirely.

In response, as illustrated, the monitoring system has triggered the drone 115 to begin a search. In some embodiments, the drone 115 is triggered based in part on the last-known position of the patient 120. For example, the system may instruct the drone 115 to move towards the exit door used by the patient, and begin the search in that area. Similarly, based on a variety of patient data (such as prior movement patterns or elopement attempts, current ability to move unassisted, and the like) and/or other real-time or historical data (such as current weather or time of day), the system may continue to predict future actions or paths, and instruct the drone to search these most-likely areas.

Upon identifying the patient 120, the drone 115 can transmit the current location to the monitoring system, enabling caregivers or others to intervene and ensure the safety of the patient.

Example System for Improved Monitoring

Figure 2:
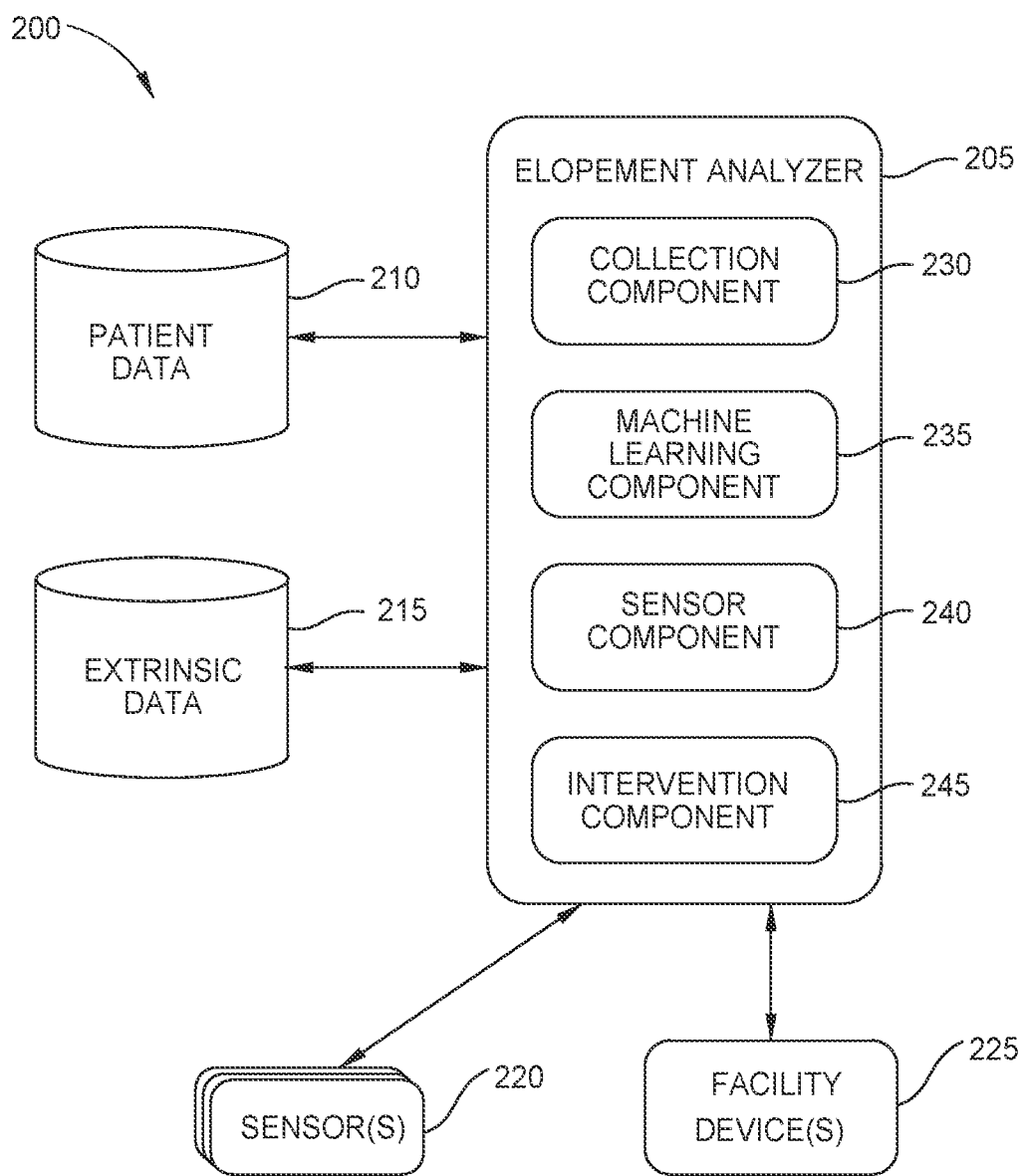
FIG. 2 depicts an example system configured to provide improved monitoring.

FIG. 2 depicts an example system 200 configured to provide improved monitoring. For example, the system 200 may operate in the environment 100 discussed above with reference to FIGS. 1A-1E.

As illustrated, the system 200 includes an elopement analyzer 205. The elopement analyzer 205 may be implemented as a software application, or as a hardware device, to act as a monitoring system for an environment. In some embodiments, the elopement analyzer 205 is present locally in the facility (e.g., operating on a server in the facility). In other embodiments, the elopement analyzer 205 may be provided remotely (e.g., in a cloud deployment).

In the illustrated example, the elopement analyzer 205 includes a collection component 230, a machine learning component 240, a sensor component 240, and an intervention component 245. Although depicted as discrete components for conceptual clarity, in embodiments, the operations of the collection component 230, machine learning component 240, sensor component 240, and intervention component 245 may be combined or distributed across any number of components or devices.

In an embodiment, the collection component 230 is generally configured to collect various data used by the system, such as patient data 210 and extrinsic data 215. Generally, the patient data 210 can include a variety of information relating to one or more patients in the care facility, such as via electronic health records (EHR) indicating current or past conditions, medications, diagnoses, assessments, and the like. In some embodiments, the patient data 210 can further include information relating to behavioral or movement patterns of each patient, mood patterns of the patient, familial data or other contact information, historical or recent events that may be significant for each patient (e.g., because the patient may be more likely to elope on a significant anniversary), information relating to prior elopements, information indicating how long the patient has resided in the facility, the assigned location(s) (e.g., the assigned room) of the patient in the facility, and the like.

The extrinsic data 215 can generally include a variety of data that is not patient-specific, but that may nevertheless aid in the prediction or detection of elopements. For example, extrinsic data may include information such as the total number of patients in the facility, the number and distribution of caregivers, the number, arrangement, and type of any barriers in the facility that can prevent or discourage elopement, significant or potentially impactful events that are not specific to the patients (e.g., disruptive weather, political, or social events) and the like. In some embodiments, the extrinsic data can also include more real-time data such as current weather.

In the illustrated embodiment, the collected information can be provided to the machine learning component 240, which evaluates it using one or more trained machine learning models to generate one or more elopement likelihoods indicating a risk of elopement. Though not depicted in the illustrated example, in some embodiments, the data can undergo preprocessing, filtering, or other operations to prepare it for use by the machine learning component 240. In some embodiments, the machine learning component 240 can generate patient-specific scores. That is, the machine learning component 240 can generate a respective elopement likelihood for each respective patient in the facility, where the respective score indicates a likelihood or probability of the respective patient eloping. In some embodiments, the machine learning component 240 can additionally or alternatively generate elopement likelihoods for one or more groups of patients (e.g., a facility-wide score), indicating an overall level of risk for the facility. Based on such grouped scores (e.g., if they exceed a threshold), the elopement analyzer 205 may determine, suggest, or recommend to enact various interventions such as increased staffing or training, or facility-wide events or group therapies, with or without activating additional sensors.

In some embodiments, in addition to generating an elopement likelihood for each patient, the machine learning component 240 can also (or alternatively) predict a severity of elopement for each patient. For example, based on the patient's conditions and history, the current weather, and the like, the machine learning component 240 may estimate, for each patient, how severe or dangerous elopement would be. In some embodiments, this severity score is combined or aggregated with the elopement likelihood to generate an overall risk score for the patient. In other embodiments, the severity score is provided alongside the elopement likelihood, enabling more granular understanding of the at-risk patients and the likely level of risk.

In an embodiment, the generated elopement likelihoods (and/or severity scores) are compared against one or more defined thresholds. If the threshold is exceeded for one or more patients (or for the entire facility), in an embodiment, the sensor component 240 can selectively enable one or more of the sensors 220 in the facility. For example, as discussed above, the sensor component 240 may enable activity sensors located in an assigned room of the patient (e.g., pressure sensors on the floor to determine whether the patient is present, cameras or microphones in or near the room to identify the patient, biometric sensors associated with the patient, and the like). As discussed above, this selective sensor enablement can protect patient privacy while protecting or improving patient security. Further, the selective use of the sensors 220 can reduce computational expense and power consumption in the system 200.

In an embodiment, the sensor component 240 can generally identify some set of sensors to be activated based, at least in part, on the identity of the patient (e.g., enabling sensors associated with the at-risk patient). In some embodiments, other sensors may be activated based on other factors, such as the predicted severity of elopement. For example, if the severity exceeds a threshold, the sensor component 240 can enable additional sensors that would not otherwise be used (e.g., sensors in employee-only spaces, sensors in other private rooms, and the like) to improve the probability of quickly locating the patient.

The sensor component 240 collects and/or records data from the activated sensors 220. In some embodiments, the sensor component 240 evaluates some or all of the data to determine whether the patient is actively eloping (or is about to elope). For example, the sensor component 240 may determine a location of the patient. In some embodiments, however, some or all of the sensor data is evaluated by the intervention component 245.

The intervention component 245 can generally select, generate, or otherwise enact interventions to prevent or respond to elopements. For example, if the patient is not actively eloping but the generated elopement likelihood is high, the intervention component 245 may evaluate the patient data 210 and/or extrinsic data 215 collected by the collection component 230 to suggest therapies or other actions, such as prompting or requesting associates of the patient (e.g., family members or friends) to contact the patient, in an effort to reduce the risk.

In an embodiment, if the patient is eloping or is about to elope, the intervention component 245 can interact with the facility devices 225 to respond appropriately. For example, the intervention component 245 may lock or unlock doors and windows, alert caregivers, guide caregivers to intercept the patient, output media to influence the patient, and the like.

Example Workflow for Improved Data Monitoring

Figure 3:
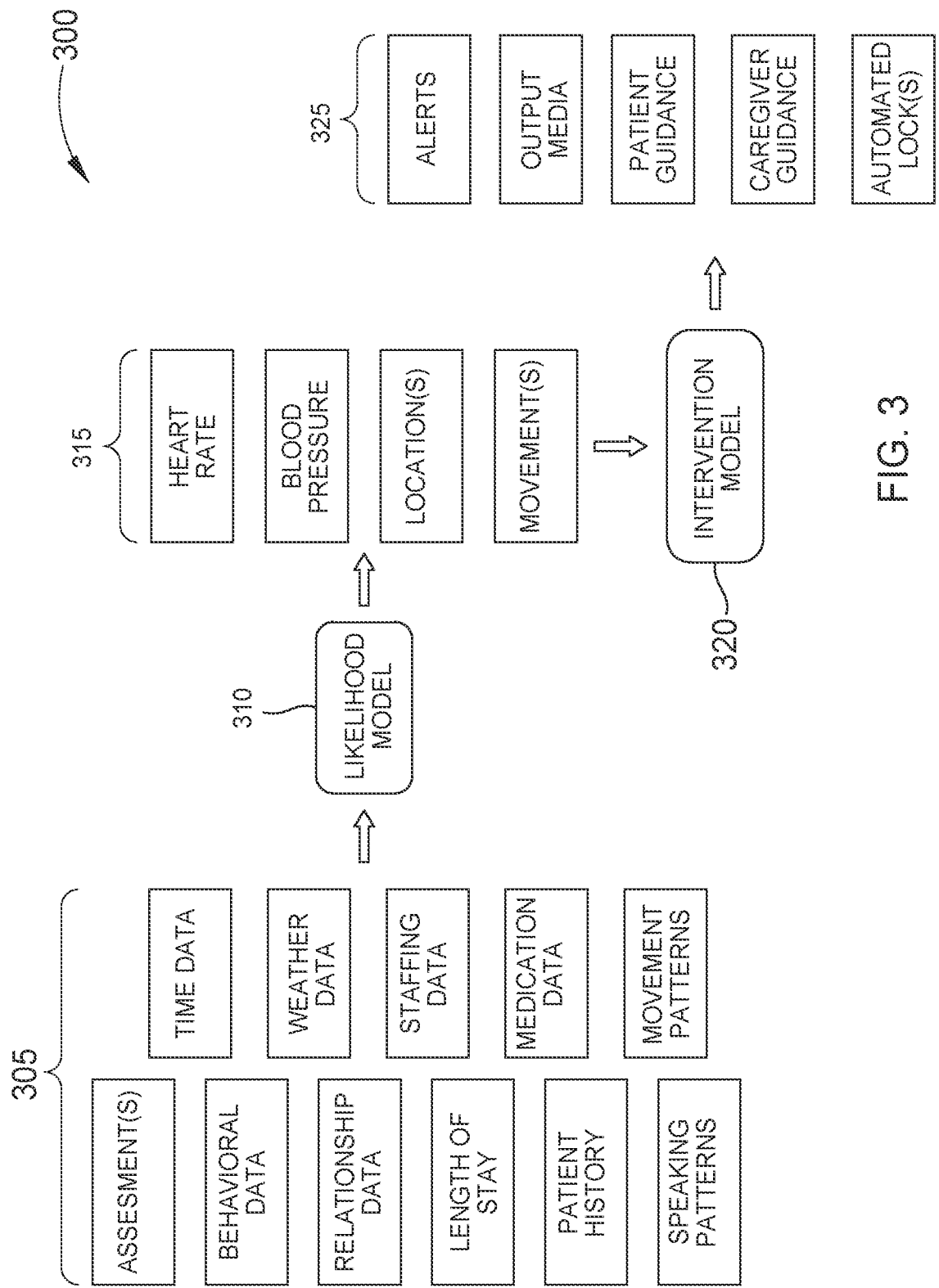
FIG. 3 depicts an example workflow for monitoring and processing patient data.

FIG. 3 depicts an example workflow 300 for monitoring and processing patient data. In some embodiments, the workflow 300 is performed by the elopement analyzer 205 discussed above with reference to FIG. 2.

In the illustrated workflow 300, a variety of data 305, which may include patient-specific data (e.g., patient data 210 in FIG. 2) or non-patient-specific data (e.g., extrinsic data 215 in FIG. 2), is collected (e.g., by the collection component 230 of FIG. 2) and processed using a likelihood model 310. In the specific example, the input data 305 includes caregiver assessments of the patient (e.g., recorded or written assessments regarding the patient's mental or physical state), behavioral data (e.g., indicating current or previous behaviors, moods or agitation, restlessness, or patterns the patient engages in), and the like.

In the illustrated example, relationship data may indicate relationships of the patient, such as family, friendships, trusted caregivers or authority figures, and the like. In some embodiments, the relationship data can further indicate any changes in the relationships, or conflict in these relationships. The length-of-stay data can generally indicate how long the patient has resided in the current facility. In some embodiments, this duration can affect the likelihood or probability of elopement (where some patients may be more likely to elope when they first arrive in a new facility and/or when they have resided in the facility for a long period of time).

The patient history can generally include a wide variety of data, including diagnoses (such as dementia) of the patient. In some embodiments, the patient history may also include data such as Internet or search history of the patient (which may indicate a desire to elope), social media posts or activity of the patient, and the like.

The speaking patterns of the patient can include aspects such as when the patient tends to speak, how long they tend to speak for at a time (e.g., how many words in a sentence or conversation), types of words they tend to use, how often they use specific words such as curse words, and the like. Additionally, the movement patterns of the patient may include learned behaviors of the patient, such as when they tend to wake and go to sleep, when they use the bathroom or other facilities, when and where they tend to engage in activities in the care setting, and the like. In some embodiments, the movement patterns can also include any schedules of the patient's day (e.g., when they are scheduled to engage in therapies or activities). Medication data generally indicates medications that the patient is currently on or has been on in the past. These medications may, in some cases, have an impact on the risk of elopement.

In an embodiment, the staffing data may indicate, for example, the number of caregivers or other staff in the facility at a given time, the ratio of caregivers to patients, the training or experience of the staff, and the like. Weather data can include, for example, the current, recent, or predicted future weather (e.g., whether it will rain, the temperature, and the like). Time data can generally include aspects such as the time of year, time of day, date, and the like.

Although the illustrated example includes a variety of specific sets of input data 305, in embodiments, the system may evaluate any combination of data from any number of sources.

In the illustrated workflow 300, the input data 305 is processed by a likelihood model 310. In some embodiments, the likelihood model 310 is a trained machine learning model (e.g., trained and/or used by the machine learning component 235 in FIG. 2). The likelihood model 310 can generally predict or estimate the risk of elopement (which may include the probability of elopement, the severity of elopement, and the like) for each patient based on the input data 305.

Based on the output of the likelihood model 310, the system can take a variety of actions (as indicated by the arrow between the likelihood model 310 and data 315, indicating a causal or control flow). In one embodiment, if the output satisfies some criteria (e.g., a first threshold score) but does not satisfy other criteria (e.g., a second threshold score), interventions such as assigning the patient to a new room, proposing new activities, engaging in new therapies, and the like can be used. If the elopement likelihood satisfies another set of criteria (e.g., exceeding the second threshold), the system can dynamically select and enable a set of sensors, as discussed above.

In the illustrated workflow 300, based on the output of the likelihood model 310, the system enables sensors to collect sensor data 315. In some embodiments, this may be referred to as real-time data, in that it is collected in response to determining that the likelihood or probability of elopement exceeds a threshold (as opposed to the data 305 that can be collected periodically or continuously regardless of risk). As illustrated, this sensor data 315 can include items such as the current heart rate of the patient, current blood pressure, current location of the patient, and/or movements of the patient.

For example, via wearable, implantable, and/or ingestible devices, the system may determine the patient's heart rate, blood pressure, adrenaline level, and the like. This information can help determine whether the patient is actively eloping (or is about to). For example, if the heart rate, blood pressure, and/or adrenaline levels are elevated (as compared to the patient's normal levels, and/or in view of the current activities or ongoing events for the patient), the system may infer that the patient plans to elope. Additionally, imaging sensors may be used to collect images in the facility, and the patient may be identified based on their face, gait, height, body style, and the like via computer-vision algorithms. In some embodiments, in addition to identifying the patient, such sensor data can also be used to identify deviations or changes in the patient's behavior (e.g., if their gait has changed). Similarly, other sensors such as RFID sensors, global or local positioning sensors, and the like can be used.

Additionally, in at least one embodiment, the patient's location can be determined by triggering a device associated with the patient (e.g., their smartphone or wearable device) to output audio that can be detected by caregivers and/or by microphones in the facility. In some embodiments, this audio can be structured such that it is imperceptible to human users (e.g., above a defined frequency), but that it can be heard by microphone sensors. Sensor data 315 from these microphones can then be used to locate the patient.

As additional non-limiting examples, the sensors may include IR sensors or pressure sensors (e.g., in the room of the patient), which may be used to detect their presence and/or to monitor their gait or walking pattern (e.g., to determine whether they are pacing or otherwise engaging in changed activity). Further, microphones may be used to record audio of the patient, which may be evaluated to determine their tone or mood, current speaking patterns, and the like.

Although the illustrated example includes a variety of specific sets of sensor data 315, in embodiments, the system may evaluate any combination of data from any number of sources.

As illustrated, the sensor data 315 is provided to an intervention model 320, which can generate and enact one or more interventions 325. In some embodiments, the intervention model 320 can evaluate the sensor data 315 to determine whether the patient is eloping (or will likely elope imminently). In the illustrated example, the interventions 325 can include alerts, media output, patient guidance, caregiver guidance, automated locks, and the like. Although the illustrated example includes a variety of specific interventions 325, in embodiments, the system may enact a wide variety of other interventions.

Generally, alert-based interventions may correspond to generating and transmitting alerts (e.g., notifications, text messages, automated calls, and the like) to one or more other individuals, such as caregivers, family members of the patient, designated friends of the patient, and the like. The particular content of the alert may vary depending on the particular implementation (as well as depending on the identity of the recipient). For example, a caregiver may receive an alert specifying the current or predicted location of the patient, while a remote family member may receive an invitation to join a video or voice chat session with the patient (e.g., in an attempt to stop an ongoing elopement).

In some embodiments, rather than an urgent alert to an ongoing elopement, the alerts may indicate that the patient is considered "at-risk" of elopement. For example, the system may automatically contact family members and urge or prompt them to engage with the patient (e.g., to visit, send a message, call, and the like) in an effort to reduce the risk.

In an embodiment, media output interventions 325 can generally include outputting media (e.g., audio, video, or a combination) for the patient. For example, the system may determine the patient's favorite music (e.g., genre, artist, song, and the like), and output this music via one or more devices associated with the patient (e.g., via the patient's smartphone) and/or via devices in the area of the patient (e.g., via speakers or displays in the room). In a similar manner, the patient's preferred television show, movie, or other media can be determined and output. In some embodiments, the system can retrieve and output pre-recorded video and/or audio for the patient (e.g., of the patient's family members, friends, loved ones, trusted caregivers, and the like).

In some embodiments, patient guidance can include, for example, interventions 325 intended to redirect the patient to a safer area. For example, based on a variety of factors such as the patient's previous paths, the shortest path to an exit, the path with the lowest traffic (and therefore with the lowest chances of being stopped), and the like, the system may predict the future trajectory of the patient in the environment. Based on the current location and/or predicted path, the system may identify alternative paths to route the patient towards a safe area, where they can await caregiver assistance.

For example, the system may use visual displays and/or audio output, illuminated or projected arrows, lines, or other guidance, holographic representations of trusted individuals, and the like to attempt to guide the patient to follow the alternative path or to remain in place. In some embodiments, the system may additionally or alternatively use more direct methods, such as automatically closing and/or locking one or more doors, automatically opening and/or unlocking one or more other doors, and the like in an effort to guide or force the patient to follow the alternative route.

In some embodiments, the system can similarly use caregiver guidance as a targeted intervention 325. For example, based on the current and/or predicted location of the patient, the system may instruct guide the caregiver to an intercept point (e.g., using a map on the caregiver's smartphone, tablet, or display in the facility, using lighted signs, arrows, or lines, by providing an audio or textual description of the intercept point and/or intercept path, and the like). In at least one embodiment, the system can also facilitate the caregiver's movement to the patient, such as by automatically opening or unlocking one or more doors on the path, restricting or discouraging other patients or guests from entering the area (such as by closing and/or locking doors, or outputting messages via displays or speakers), and the like.

In some embodiments, the caregiver can further be instructed as to how to proceed once they reach the patient. For example, based on the patient's current state (e.g., speaking pattern, behavior or motion patterns, perceived anxiety or mood, biometric readings, and the like) the caregiver may be instructed to engage in a verbal conversation to calm the patient, or to take other actions.

Example Method for Training Machine Learning Models to Predict Elopement

Figure 4:
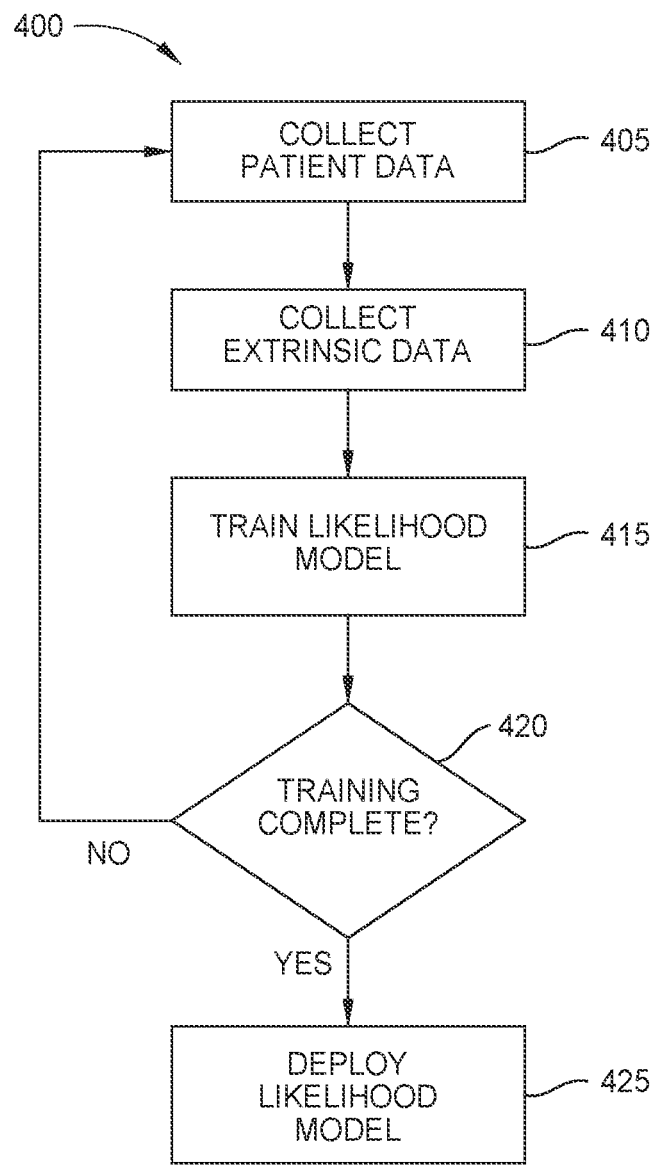
FIG. 4 is a flow diagram depicting an example method for training a machine learning model to generate elopement likelihoods.

FIG. 4 is a flow diagram depicting an example method 400 for training a machine learning model to generate elopement likelihoods. For example, the method 400 may be used to train the likelihood model 310 and/or intervention model 320 (each depicted in FIG. 3). In some embodiments, the method 400 is performed by a monitoring system (e.g., by the machine learning component 235 of FIG. 2). In other embodiments, the method 400 may be performed by one or more other components or devices, and the trained model(s) can be provided to the monitoring system for deployment.

The method 400 begins at block 405, where the system collects patient data. This may correspond, for example, to the patient data 210 in FIG. 2. For example, the system may collect information related to a given patient's medical history, behavior, speaking, and/or movement patterns, and the like.

In some embodiments, collecting the patient data corresponds to collecting relevant data for a defined window of time. That is, the patient data may be delineated into sequential windows of time, where each window is associated with the patient data at that time. In some embodiments, each window of time is further associated with some or all of the patient data from one or more prior windows of time. The windows of time may be of any length, depending on the particular implementation. For example, in various embodiments, each window of time may correspond to a given hour, a day, a week, and the like.

For example, collecting the patient data for a given window of time may include collecting caregiver assessments, medical diagnoses, medications, behavioral patterns, and the like for that window of time, as well as one or more prior windows (e.g., the immediately prior window, all windows within a year of the given window, and so on).

At block 410, the system collects extrinsic data. This may correspond, for example, to extrinsic data 215 of FIG. 2. In some embodiments, this data is also delineated into windows of time, as discussed above. For example, the system may determine the weather (e.g., temperature, precipitation, and the like) during the relevant window of time.

The method 400 then continues to block 415, where the system trains a likelihood model based on the collected data. In one embodiment, this training includes determining whether the patient (e.g., the patient associated with the patient data) eloped during the window of time. If so, a relatively high elopement likelihood (e.g., a value of one) can be used as the target output for the model. If not, a relatively low score (e.g., a value of zero) can be used.

In some embodiments, to train the likelihood model, the system processes the collected patient data and/or extrinsic data for the window of time using the likelihood model, which generates an elopement likelihood based on the data. As the model is undergoing training, this elopement likelihood may not be particularly accurate, at least during early stages of training. The system can then compare this output score to the determined ground-truth (e.g., to a score of one if the patient eloped during or shortly after the window, and a score zero if the patient did not) to generate a loss. The loss can be used to refine the weights, biases, or other parameters of the model, such as by back-propagation. In some embodiments, the training process can include operations such as feature selection (e.g., determining what data or what features were most predictive) or pruning various aspects of the model (e.g., removing low-weight sections) to improve accuracy and efficiency.

In various embodiments, this refinement process may be performed for each patient and each window of time individually (e.g., using stochastic gradient descent), or for a batch of windows and/or a batch of patients simultaneously (e.g., using batch gradient descent). In this way, the likelihood model is refined based on the historical data, and learns to generate more accurate scores (e.g., higher elopement likelihoods when elopement is likely, and lower scores when it is unlikely).

At block 420, the system determines whether training is complete. This may include, for example, determining whether additional training exemplars (e.g., additional windows of time for the patient, or additional patients) remain. In some embodiments, the termination criteria include a maximum amount of training time, a maximum number of training iterations, and the like.

If training is not complete, the method 400 returns to block 405 to begin the next iteration. If training is complete, the method 400 continues to block 425, where the model is deployed for use in a care setting.

In some embodiments, the likelihood model can be refined during use. For example, periodically (e.g., weekly) or upon occurrence of some defined event (e.g., when a patient attempts to elope), the model may be refined based on the recently-available data (e.g., the patient data and/or extrinsic data that has been collected since the last refinement).

In some embodiments, the likelihood model is trained based on patient data to provide elopement likelihoods for any patient. In at least one embodiment, however, the model may be trained or refined based on data associated with a specific patient. That is, the model may be trained or refined to provide accurate elopement likelihoods for a given patient, based on prior data from that patient.

In one such embodiment, a likelihood model may be trained based on an initial collection of data (which may include multiple patients and/or multiple facilities). This base model may then be refined for each individual patient in a given facility, such that each respective patient has a corresponding model trained for them. This can result in improved elopement likelihood measures that are more likely to reflect the true risk for the specific and individual patient.

Example Method for Monitoring Data and Enacting Targeted Interventions

Figure 5:
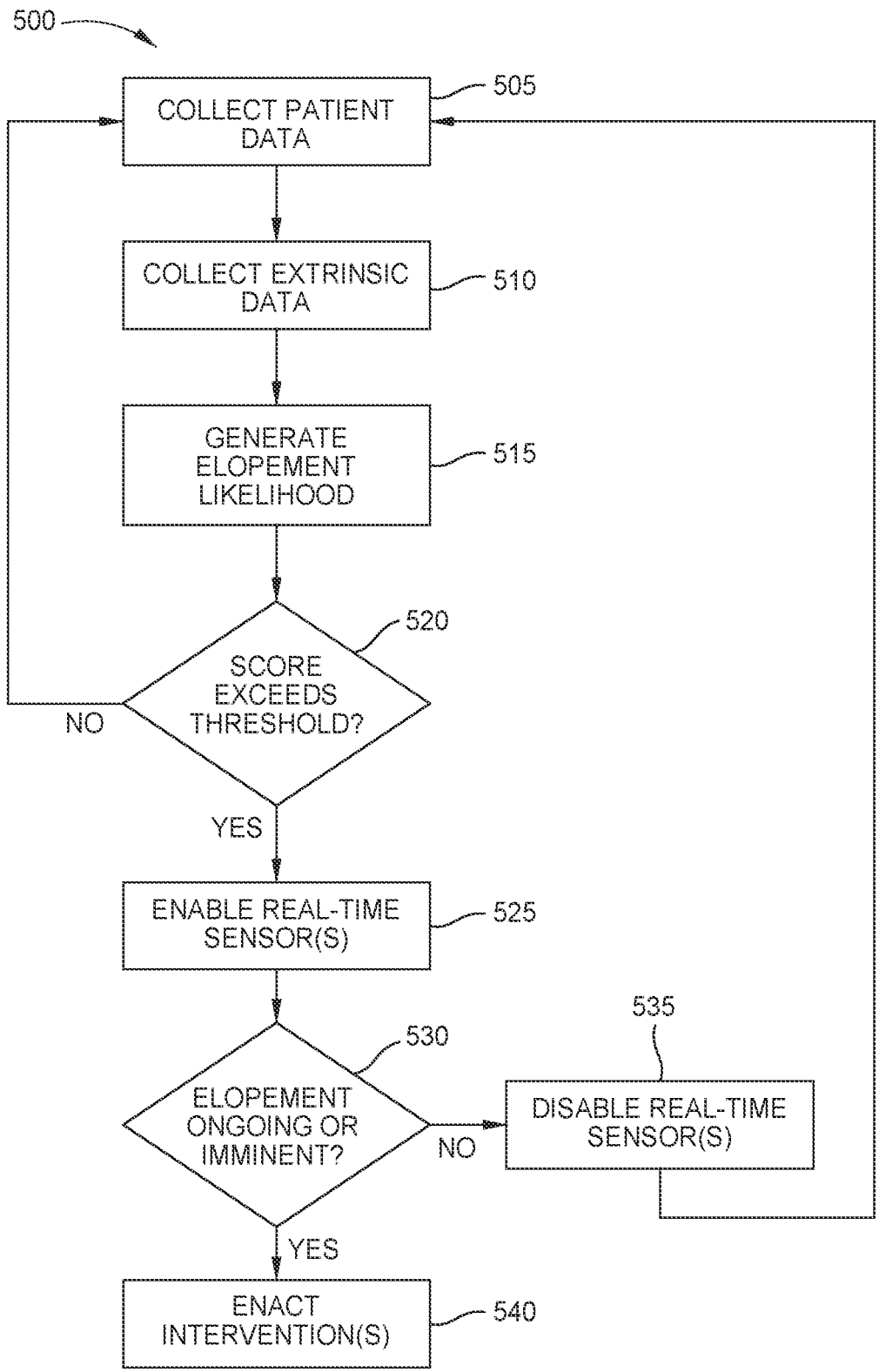
FIG. 5 is a flow diagram depicting an example method for monitoring patient data and enacting targeted interventions.

FIG. 5 is a flow diagram depicting an example method 500 for monitoring patient data and enacting targeted interventions. In some embodiments, the method 500 is performed by a monitoring system (e.g., by the elopement analyzer 205 of FIG. 2).

In some embodiments, the method 500 is performed on a per-patient basis. That is, the method 500 can be used to collect and evaluate data for a given patient, as well as to trigger specific interventions for the given patient if needed. In some embodiments, the method 500 may alternatively or additionally be used on a wider basis to evaluate data (and generate interventions) for groups of patients, such as for a set of associates or friends in the care setting, or for the entire facility.

The method 500 begins at block 505, where the monitoring system collects patient data. This may correspond, for example, to the patient data 210 in FIG. 2. For example, the system may collect information related to medical history, behavior, speaking, and/or movement patterns, and the like.

At block 510, the system collects extrinsic data. This may correspond, for example, to extrinsic data 215 of FIG. 2. For example, the system may determine the weather (e.g., temperature, precipitation, and the like) at the current time, as discussed above.

At block 515, the system uses the collected data to generate an elopement likelihood for the patient (or group of patients, as appropriate). For example, as discussed above, the system may process the data using one or more trained machine learning models to generate an elopement likelihood indicating a level of risk that the patient is either currently eloping or plans to do so. In some embodiments, as discussed above, the score may also indicate the potential severity of elopement.

At block 520, the system determines whether the generated elopement likelihood exceeds some defined threshold value. If not, the method 500 can return to block 505 to continue monitoring the patient (or to monitor a different patient). That is, if the monitoring system determines that the score is below the threshold, it may be inferred that the patient is not eloping or does not plan to elope in the immediate future, and the system can refrain from any further processing or data collection (e.g., the system need not enable additional sensors or gather more data).

In some embodiments, the threshold value may be set in a variety of ways, including manual specification (e.g., configured by an administrator or caregiver), learned over time (e.g., during training of the model), and the like. Further, in some embodiments, the particular threshold may differ depending on the identity of the patient. That is, some patients may be evaluated against higher thresholds (indicating that they are less likely to elope, even with a high elopement likelihood) as compared to others. Additionally, though a single threshold is depicted, in some embodiments, multiple thresholds may be used. For example, the system may enact non-urgent interventions for lower thresholds (e.g., suggesting new therapies or room assignments, prompting family members to reach out to the patient, and the like) while higher thresholds are used to trigger additional processing and more urgent responses.

If, at block 520, the system determines that the score exceeds the defined threshold, the method 500 continues to block 525, where the system enables or otherwise activates one or more real-time sensor devices. For example, as discussed above, the system may trigger or instruct biometric sensors on the patient to begin recording and/or transmitting data to the monitoring system. Similarly, the system may cause one or more other sensors (such as cameras) to begin recording.

In some embodiments, prior to this triggering, the sensor devices may be in a disabled or inactive state. Generally, in this state, the sensor data is not processed or analyzed. This may include, for example, refraining from collecting gathering the data (e.g., turning off a camera), refraining from recording or storing the data (e.g., discarding any data that is automatically collected), refraining from transmitting the data to the central monitoring system, refraining from storing or processing the received data at the central monitoring system, and the like. This allows the sensors to be selectively used only when elopement risk is high, reducing their computational burden and power consumption while maintain security and safety of the facility.

At block 530, the sensor data is evaluated in order to determine whether the patient is eloping (or intends to elope imminently). For example, as discussed above, data such as the patient location and/or movement can be used to determine whether the patient is out-of-bounds. Similarly, the patient's biometric data may indicate their current physiological or mental state. In some embodiments, determining that an elopement is "imminent" can include determining that elopement is likely within some defined period of time. For example, suppose the patient is lingering near an exit door, shuffling slightly and muttering or speaking quietly to themselves. In one such embodiment, the system may determine that although the patient is not currently eloping, they appear to be planning to do so. In some embodiments, elopement or imminent elopement can be detected by processing the sensor data 315 using a second machine learning model, as discussed above.

In the illustrated example, if elopement is not ongoing or imminent, the method 500 continues to block 535, where the system can disable the recently-enabled real-time sensors. As discussed above, this can include transitioning them to a disabled or inactive state, where the sensor data is not processed (e.g., because the sensors do not collect any data, because they do not record or store it, because they do not transmit it, and the like). The method 500 then returns to block 505, to begin the process anew for the patient (or for another patient).

If, at block 530, the system determines that elopement is ongoing or imminent, the method 500 continues to block 540. At block 540, the system selects and enacts one or more interventions to attempt to stop the elopement and ensure the safety of the patient. One example technique to select and enact interventions is discussed below in more detail with reference to FIG. 6.

Example Method for Selecting and Enacting Targeted Interventions

Figure 6:
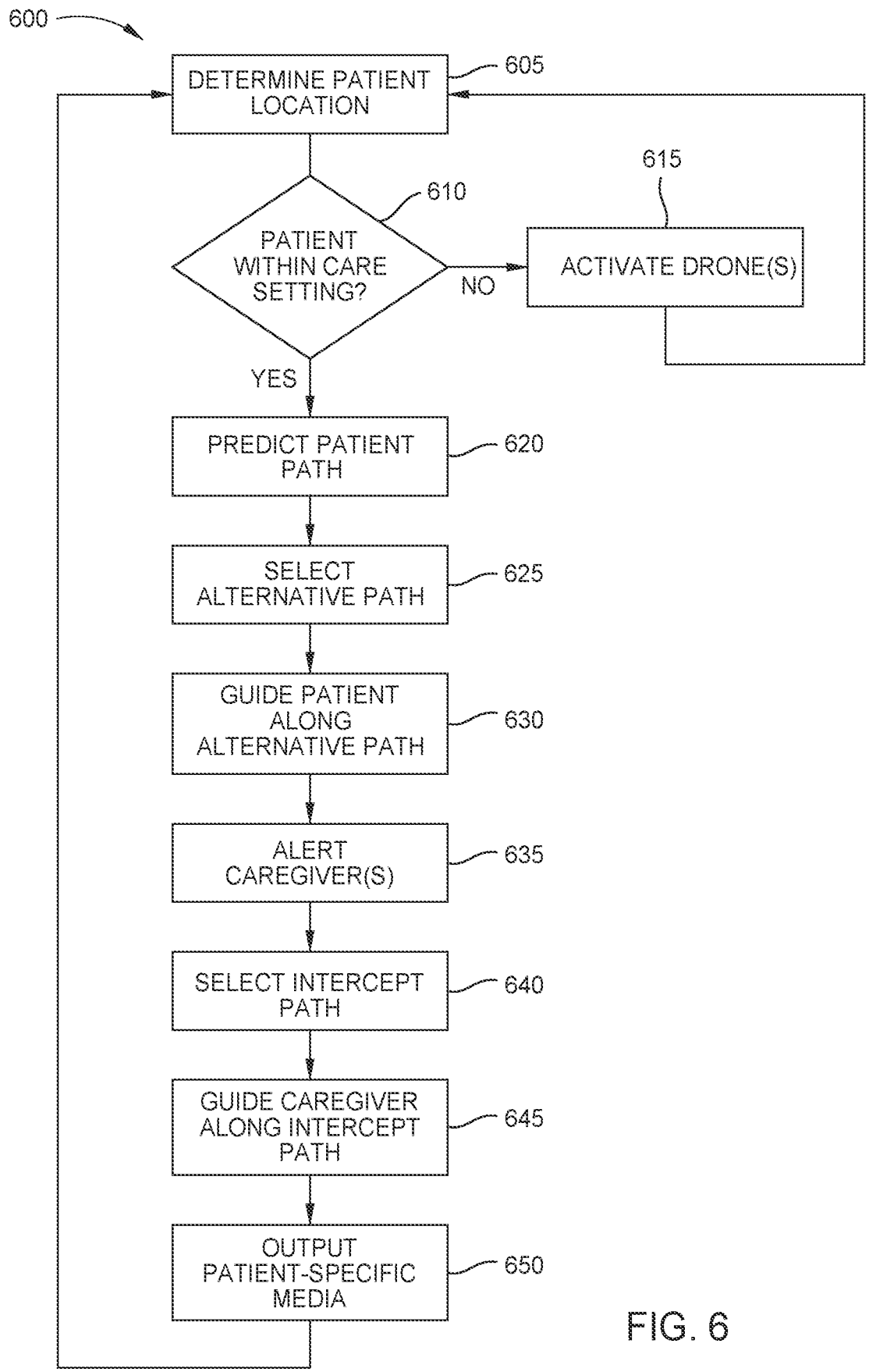
FIG. 6 is a flow diagram depicting an example method for selecting and enacting targeted elopement interventions.

FIG. 6 is a flow diagram depicting an example method 600 for selecting and enacting targeted elopement interventions. In some embodiments, the method 600 is performed by a monitoring system (e.g., by the elopement analyzer 205 of FIG. 2). In some embodiments, the method 600 provides additional detail for block 540 of FIG. 5.

The method 600 begins at block 605, where the monitoring system determines or estimates the current patient location. For example, as discussed above, the system may use one or more devices in or on the patient (e.g., wearables, smartphones, and the like) to locate the patient. Similarly, the system may use RFID sensors to locate the patient, use cameras to identify and locate the patient, and the like.

At block 610, the system determines whether the patient is within the care setting. In some embodiments, this includes determining whether the patient is within an area that has sensors capable of tracking or locating the patient, as compared to in an area that does not have such sensors (e.g., if the patient was seen exiting the building, is in a garden area, or has left the premises entirely). In the illustrated embodiment, if the patient is not in the care setting (or cannot be conclusively located in the care setting), the method 600 continues to block 615, where the monitoring system activates one or more drones to locate the patient, as discussed above.

If, at block 610, the system determines that the patient remains in the facility (e.g., that the patient is in a location where they can be located and/or tracked by the sensor suite), the method 600 continues to block 620. At block 620, the system can predict one or more future paths or trajectories of the patient. For example, based on the patient's prior movements, current distribution of other individuals (e.g., guests, other patients, and caregivers) in the space, directness of various paths to an exit, and the like, the system may identify one or more paths that the patient is likely to follow. In some embodiments, if multiple alternatives are detected, the system may score or rank these alternatives based on the above-discussed criteria (e.g., based on which paths the patient generally follows, which paths are most direct, which paths have the least traffic, and the like).

At block 625, the system can identify or select an alternative path for the patient. That is, based on a floor plan of the facility and the current or predicted path of the patient, the system may identify alternatives that would improve the safety or security of the patient. For example, the system may identify alternative paths that would lead the patient away from potentially-dangerous areas (e.g., outdoors) and towards safer areas (e.g., towards caregivers or other safe locations). In some embodiments, the alternative paths may also include a path corresponding to the patient remaining in the current location, a path that would cause the patient to loop or circle the area, and the like.

At block 630, the system can then enact the intervention by guiding the patient along the alternative. For example, using illuminated or projected signs, arrows, lines, or other guidance, the system may encourage the patient to follow the alternative path. Similarly, using video, audio, and/or holographic representations of a trusted individual (e.g., a family member or caregiver), the system can encourage the patient to follow the alternative path. In some embodiments, this guidance also or alternatively includes automatically opening and/or unlocking certain doors, automatically closing and/or locking certain doors, and the like.

At block 635, the system alerts one or more caregivers. For example, the system may identify one or more caregivers within a defined distance or response time (based on the facility map), identify caregivers assigned to the area, and the like. In some embodiments, the alert prompts the caregiver to accept or otherwise assert that they will respond to the elopement.

In embodiments, the alert can include a variety of information, including the identity of the eloping patient, their current (or last known) location and/or movement, their predicted or known physiological or mental state, and the like.

At block 640, the system can select an intercept path for each responding caregiver. For example, based on the facility map, the current and/or future location of the patient, and the current location of the caregiver, the system can map out a shortest route to intercept the patient.

At block 645, the system guides the caregiver along the intercept path. In some embodiments, this guidance can include similar efforts to those used to guide the patient, including signage, arrows, lines, or other indicators. In at least one embodiment, the caregiver is provided with a textual or oral description of the intercept (e.g., "move to the recreation room via the east hallway, intercept patient leaving recreation room"). In some embodiments, the guidance can include outputting a map on the patient's device indicating the path, updating a nearby display (e.g., a smart television) to show the path, and the like.

At block 650, the system can select and output patient-specific media, as discussed above. For example, via one or more output devices near the patient, the system may output the patient's favorite music, shows, movies, and the like. In some embodiments, the system may output pre-recorded audio and/or video of the patient's associates, such as family members, friends, or other trusted individuals. In at least one embodiment, the system can attempt to initiate a live communication session with one or more of these trusted associates.

The method 600 then returns to block 605, to determine an updated location of the patient. In this way, the method 600 can repeat (providing updated targeted interventions) until caregivers are able to reach the patient and ensure their safety.

Example Method for Evaluating Data and Enacting Targeted Interventions

Figure 7:
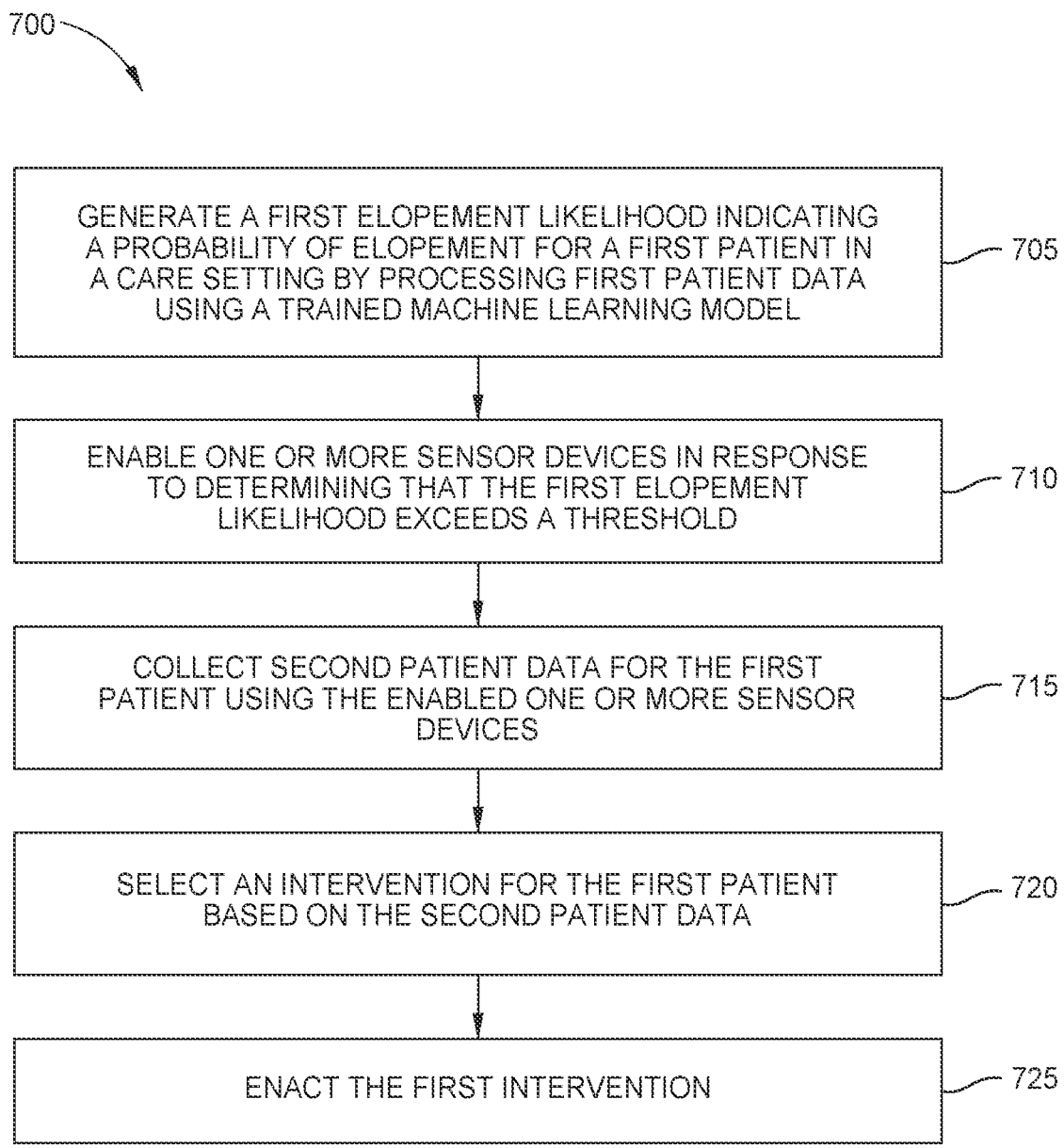
FIG. 7 is a flow diagram depicting an example method for evaluating patient data and enacting targeted interventions.

FIG. 7 is a flow diagram depicting an example method 700 for evaluating patient data and enacting targeted interventions. In some embodiments, the method 700 is performed by a monitoring system (e.g., by the elopement analyzer 205 of FIG. 2).

At block 705, a monitoring system generates a first elopement likelihood indicating a probability of elopement for a first patient in a care setting by processing first patient data using a trained machine learning model.

In some embodiments, the first patient data comprises at least one of: medical records of the patient, a length of time the patient has been in the care setting, familial contact information for the patient, a caregiver assessment for the patient, a history of elopement for the patient, a speaking pattern of the patient, or a movement pattern of the patient.

At block 710, the monitoring system enables one or more sensor devices in response to determining that the first elopement likelihood exceeds a threshold.

In some embodiments, prior to generating the first elopement likelihood, during at least one window of time when a second elopement likelihood for the patient did not exceed the threshold, data about the patient was not recorded from the one or more sensor devices, and the one or more sensor devices comprise at least one of biometric sensors for the patient, location sensors for the patient, a wearable device of the patient, a wireless communication device of the patient, or activity sensors in an assigned room of the patient.

At block 715, collects second patient data for the first patient using the enabled one or more sensor devices.

At block 720, the monitoring system selects an intervention for the first patient based on the second patient data.

In some embodiments, selecting the intervention comprises determining a current location of the patient based on the second patient data and predicting a future action of the patient based on the current location. In some embodiments, the future action of the patient comprises a future path of the patient.

At block 725, the monitoring system enacts the intervention.

In some embodiments, the intervention comprises at least one of one or more therapies for the patient or prompting one or more associates of the patient to engage with the patient.

In some embodiments, selecting the intervention further comprises selecting an alternate action for the patient based on a layout of the care setting, and enacting the intervention comprises guiding the patient to follow the alternate action.

In some embodiments, selecting the intervention further comprises identifying one or more caregivers based on the current location of the patient and the predicted future action of the patient, and enacting the intervention comprises transmitting an alert to the identified one or more caregivers, wherein the alert indicates the current location of the patient and the predicted future action of the patient.

In some embodiments, selecting the intervention further comprises identifying an intercept path based on a current location of at least one of the one or more caregivers and the predicted future action of the patient, and enacting the intervention comprises guiding at least one of the one or more caregivers to follow the intercept path.

In some embodiments, guiding at least one of the one or more caregivers to follow the intercept path comprises at least one of: providing a map via one or more mobile devices of the one or more caregivers, wherein the map indicates the intercept path and the current location of the patient, updating one or more displays in the care setting to indicate the intercept path, or transmitting a textual description of the intercept path.

In some embodiments, selecting the intervention comprises selecting patient-specific media for the patient, and enacting the intervention comprises outputting the patient-specific media via one or more media devices in the care setting.

In some embodiments, selecting the intervention comprises determining that the patient has left the care setting, and enacting the intervention comprises triggering a drone to search outside of the care setting.

Figure 8:
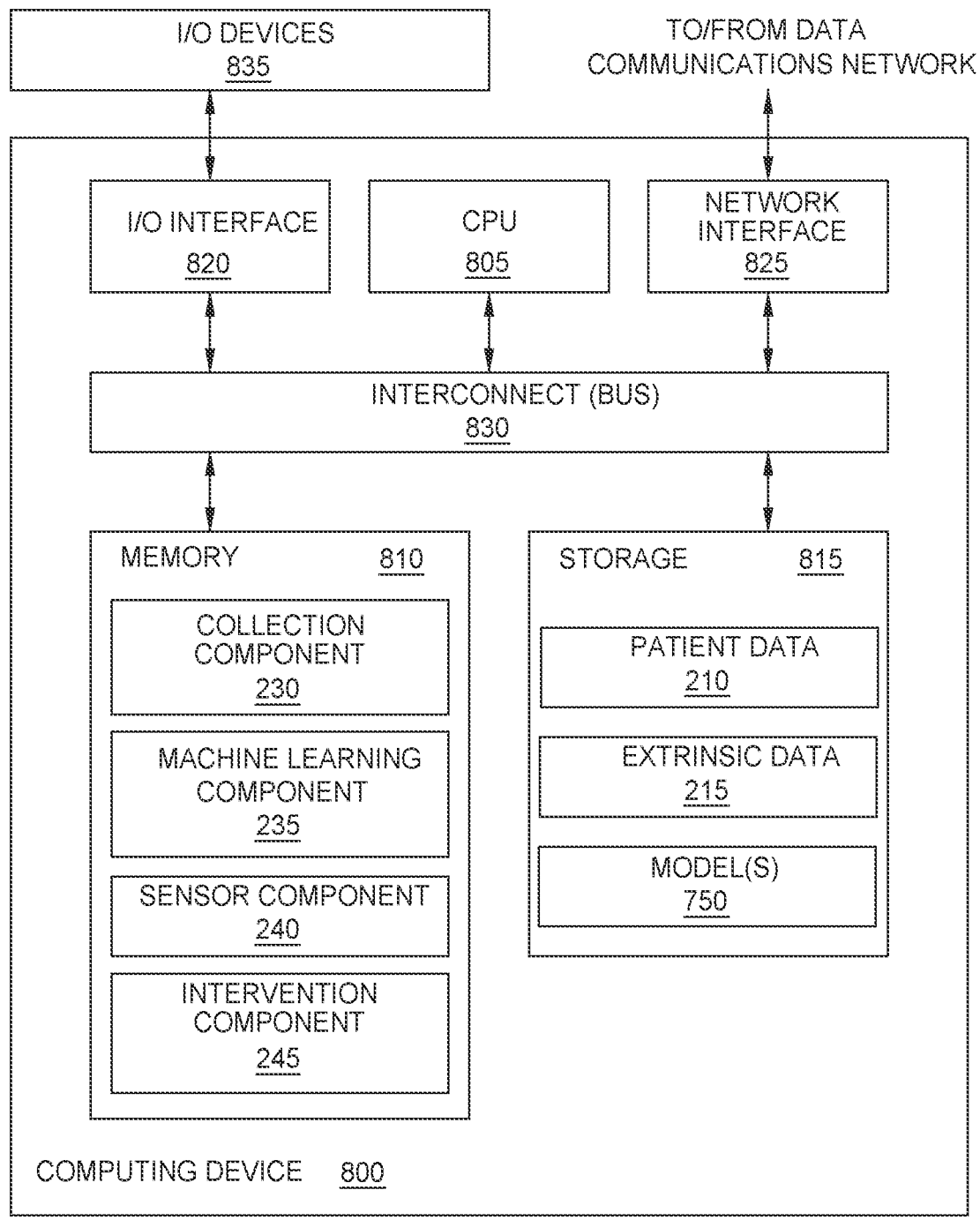
FIG. 8 depicts an example computing device configured to perform various aspects of the present disclosure.

Example Processing System for Monitoring Data and Enacting Targeted Interventions FIG. 8 depicts an example computing device 800 configured to perform various aspects of the present disclosure. Although depicted as a physical device, in embodiments, the computing device 800 may be implemented using virtual device(s), and/or across a number of devices (e.g., in a cloud environment). In one embodiment, the computing device 800 corresponds to the elopement analyzer 205 of FIG. 2.

As illustrated, the computing device 800 includes a CPU 805, memory 810, storage 815, a network interface 825, and one or more I/O interfaces 820. In the illustrated embodiment, the CPU 805 retrieves and executes programming instructions stored in memory 810, as well as stores and retrieves application data residing in storage 815. The CPU 805 is generally representative of a single CPU and/or GPU, multiple CPUs and/or GPUs, a single CPU and/or GPU having multiple processing cores, and the like. The memory 810 is generally included to be representative of a random access memory. Storage 815 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, storage 815, network interface(s) 825, and I/O interface(s) 820 are communicatively coupled by one or more buses 830.

In the illustrated embodiment, the memory 810 includes a collection component 230, machine learning component 235, sensor component 240, and intervention component 245, each discussed above with reference to FIG. 2, which may perform one or more embodiments discussed above. Although depicted as discrete components for conceptual clarity, in embodiments, the operations of the depicted components (and others not illustrated) may be combined or distributed across any number of components. Further, although depicted as software residing in memory 810, in embodiments, the operations of the depicted components (and others not illustrated) may be implemented using hardware, software, or a combination of hardware and software.

In the illustrated example, the storage 815 includes patient data 210 and extrinsic data 215, each discussed above with reference to FIG. 2. Although depicted as residing in storage 815, the patient data 210 and extrinsic data 215 may be stored in any suitable location, including memory 810, as well as one or more remote storage locations. As illustrated, the storage 815 also includes one or more models 750. For example, the models 750 may correspond to one or more likelihood models (e.g., likelihood model 310 in FIG. 3), one or more intervention models (e.g., intervention model 320 in FIG. 3), and the like.

Example Clauses

Clause 1: A method, comprising: generating a first elopement likelihood indicating a probability of elopement for a patient in a care setting by processing first patient data using a trained machine learning model; enabling one or more sensor devices in response to determining that the first elopement likelihood exceeds a threshold; collecting second patient data for the patient using the enabled one or more sensor devices; selecting an intervention for the patient based on the second patient data; and enacting the intervention.

Clause 2: The method of Clause 1, wherein the intervention comprises at least one of one or more therapies for the patient or prompting one or more associates of the patient to engage with the patient.

Clause 3: The method of any one of Clauses 1-2, wherein selecting the intervention comprises: determining a current location of the patient based on the second patient data; and predicting a future action of the patient based on the current location.

Clause 4: The method of any one of Clauses 1-3, wherein the future action of the patient comprises a future path of the patient.

Clause 5: The method of any one of Clauses 1-4, wherein: selecting the intervention further comprises selecting an alternate action for the patient based on a layout of the care setting; and enacting the intervention comprises guiding the patient to follow the alternate action.

Clause 6: The method of any one of Clauses 1-5, wherein: selecting the intervention further comprises identifying one or more caregivers based on the current location of the patient and the predicted future action of the patient; and enacting the intervention comprises transmitting an alert to the identified one or more caregivers, wherein the alert indicates the current location of the patient and the predicted future action of the patient.

Clause 7: The method of any one of Clauses 1-6, wherein: selecting the intervention further comprises identifying an intercept path based on a current location of at least one of the one or more caregivers and the predicted future action of the patient; and enacting the intervention comprises guiding at least one of the one or more caregivers to follow the intercept path.

Clause 8: The method of any one of Clauses 1-7, wherein guiding at least one of the one or more caregivers to follow the intercept path comprises at least one of: providing a map via one or more mobile devices of the one or more caregivers, wherein the map indicates the intercept path and the current location of the patient; updating one or more displays in the care setting to indicate the intercept path; or transmitting a textual description of the intercept path.

Clause 9: The method of any one of Clauses 1-8, wherein: selecting the intervention comprises selecting patient-specific media for the patient; and enacting the intervention comprises outputting the patient-specific media via one or more media devices in the care setting.

Clause 10: The method of any one of Clauses 1-9, wherein: selecting the intervention comprises determining that the patient has left the care setting; and enacting the intervention comprises triggering a drone to search outside of the care setting.

Clause 11: The method of any one of Clauses 1-10, wherein the first patient data comprises at least one of: medical records of the patient; a length of time the patient has been in the care setting; familial contact information for the patient; a caregiver assessment for the patient; a history of elopement for the patient; a speaking pattern of the patient; or a movement pattern of the patient.

Clause 12: The method of any one of Clauses 1-11, wherein: prior to generating the first elopement likelihood, during at least one window of time when a second elopement likelihood for the patient did not exceed the threshold, data about the patient was not recorded from the one or more sensor devices; and the one or more sensor devices comprise at least one of: biometric sensors for the patient; location sensors for the patient; a wearable device of the patient; a wireless communication device of the patient; or activity sensors in an assigned room of the patient.

Clause 13: A system, comprising: a memory comprising computer-executable instructions; and one or more processors configured to execute the computer-executable instructions and cause the processing system to perform a method in accordance with any one of Clauses 1-12.

Clause 14: A system, comprising means for performing a method in accordance with any one of Clauses 1-12.

Clause 15: A non-transitory computer-readable medium comprising computer-executable instructions that, when executed by one or more processors of a processing system, cause the processing system to perform a method in accordance with any one of Clauses 1-12.

Clause 16: A computer program product embodied on a computer-readable storage medium comprising code for performing a method in accordance with any one of Clauses 1-12.

ADDITIONAL CONSIDERATIONS

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., elopement analyzer 205) or related data available in the cloud. For example, the elopement analyzer 205 could execute on a computing system in the cloud and generate elopement likelihoods. In such a case, the elopement analyzer 205 could generate scores and selectively enable or disable sensors, and store the models, sensor data, and/or extrinsic data at a storage location in the cloud. Doing so allows a user to access this information from any computing system attached to a network connected to the cloud (e.g., the Internet).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   generating a first elopement likelihood indicating a probability of elopement for a patient in a care setting by processing, using a trained machine learning model, first patient data comprising (i) one or more caregiver assessments for the patient and (ii) non-patient-specific extrinsic data;
   determining whether the first elopement likelihood exceeds a threshold;
   in response to determining that the first elopement likelihood exceeds the threshold:

enabling, by a monitoring system, one or more sensor devices comprising one or more wearable biometric sensors, comprising transmitting, by the monitoring system and to the one or more sensor devices, an instruction causing the one or more sensor devices to begin transmitting sensor data to the monitoring system; and subsequent to enabling the one or more sensor devices, receiving biometric data for the patient from the enabled one or more sensor devices, wherein the biometric data comprises real-time data;

selecting an intervention for the patient based on the biometric data; and enacting the intervention.

2. The method of claim 1, wherein the intervention comprises at least one of one or more therapies for the patient or prompting one or more associates of the patient to engage with the patient.

3. The method of claim 1, wherein selecting the intervention comprises:

determining a current location of the patient based on second patient data; and predicting a future action of the patient based on the current location.

4. The method of claim 3, wherein the future action of the patient comprises a future path of the patient.

5. The method of claim 3, wherein:

selecting the intervention further comprises selecting an alternate action for the patient based on a layout of the care setting; and enacting the intervention comprises guiding the patient to follow the alternate action.

6. The method of claim 3, wherein:

selecting the intervention further comprises identifying one or more caregivers based on the current location of the patient and the predicted future action of the patient; and enacting the intervention comprises transmitting an alert to the identified one or more caregivers, wherein the alert indicates the current location of the patient and the predicted future action of the patient.

7. The method of claim 6, wherein:

selecting the intervention further comprises identifying an intercept path based on a current location of at least one of the one or more caregivers and the predicted future action of the patient; and enacting the intervention comprises guiding at least one of the one or more caregivers to follow the intercept path.

8. The method of claim 7, wherein guiding at least one of the one or more caregivers to follow the intercept path comprises at least one of:

providing a map via one or more mobile devices of the one or more caregivers, wherein the map indicates the intercept path and the current location of the patient;

updating one or more displays in the care setting to indicate the intercept path; or transmitting a textual description of the intercept path.

9. The method of claim 1, wherein:

selecting the intervention comprises selecting patient-specific media for the patient; and enacting the intervention comprises outputting the patient-specific media via one or more media devices in the care setting.

10. The method of claim 1, wherein:

selecting the intervention comprises determining that the patient has left the care setting; and enacting the intervention comprises triggering a drone to search outside of the care setting.

11. The method of claim 1, wherein the first patient data further comprises at least one of:

medical records of the patient;

a length of time the patient has been in the care setting;

familial contact information for the patient;

a history of elopement for the patient;

a speaking pattern of the patient; or a movement pattern of the patient.

12. The method of claim 1, wherein:

prior to generating the first elopement likelihood, during at least one window of time when a second elopement likelihood for the patient did not exceed the threshold, data about the patient was not recorded from the one or more sensor devices; and the one or more sensor devices further comprise at least one of:

location sensors for the patient;

a wearable device of the patient;

a wireless communication device of the patient; or activity sensors in an assigned room of the patient.

13. A computer product comprising logic encoded in a non-transitory medium, the logic executable by operation of one or more computer processors to perform an operation comprising:

generating a first elopement likelihood indicating a probability of elopement for a patient in a care setting by processing, using a trained machine learning model, first patient data comprising: (i) one or more caregiver assessments for the patient and (ii) non-patient-specific extrinsic data;

determining whether the first elopement likelihood exceeds a threshold;

in response to determining that the first elopement likelihood exceeds a threshold:

enabling, by a monitoring system, one or more sensor devices comprising one or more wearable biometric sensors, comprising transmitting, by the monitoring system and to the one or more sensor devices, an instruction causing the one or more sensor devices to begin transmitting sensor data to the monitoring system; and subsequent to enabling the one or more sensor devices, receiving biometric data for the patient from the enabled one or more sensor devices, wherein the biometric data comprises real-time data;

selecting an intervention for the patient based on the biometric data; and enacting the intervention.

14. The computer product of claim 13, wherein selecting the intervention comprises:

determining a current location of the patient based on second patient data; and predicting a future action of the patient based on the current location.

15. The computer product of claim 14, wherein:

selecting the intervention further comprises identifying one or more caregivers based on the current location of the patient and the predicted future action of the patient; and enacting the intervention comprises transmitting an alert to the identified one or more caregivers, wherein the alert indicates the current location of the patient and the predicted future action of the patient.

16. The computer product of claim 13, wherein:

selecting the intervention comprises selecting patient-specific media for the patient; and enacting the intervention comprises outputting the patient-specific media via one or more media devices in the care setting.

17. A system comprising:

one or more computer processors; and logic encoded in a non-transitory medium, the logic executable by operation of the one or more computer processors to perform an operation comprising:

generating a first elopement likelihood indicating a probability of elopement for a patient in a care setting by processing, using a trained machine learning model, first patient data comprising (i) one or more caregiver assessments for the patient and (ii) non-patient-specific extrinsic data;

in response to determining that the first elopement likelihood exceeds a threshold:

enabling, by a monitoring system, one or more sensor devices comprising one or more wearable biometric sensors, comprising transmitting, by the monitoring system and to the one or more sensor devices, an instruction causing the one or more sensor devices to begin transmitting sensor data to the monitoring system; and subsequent to enabling the one or more sensor devices, receiving biometric data for the patient from the enabled one or more sensor devices, wherein the biometric data comprises real-time data;

selecting an intervention for the patient based on the biometric data; and enacting the intervention.

18. The system of claim 17, wherein selecting the intervention comprises:

determining a current location of the patient based on the second patient data; and predicting a future action of the patient based on the current location.

19. The system of claim 18, wherein:

selecting the intervention further comprises identifying one or more caregivers based on the current location of the patient and the predicted future action of the patient; and enacting the intervention comprises transmitting an alert to the identified one or more caregivers, wherein the alert indicates the current location of the patient and the predicted future action of the patient.

20. The system of claim 17, wherein:

selecting the intervention comprises selecting patient-specific media for the patient; and enacting the intervention comprises outputting the patient-specific media via one or more media devices in the care setting.

* * * * *